US010662112B2

(12) United States Patent
Vilinska et al.

(10) Patent No.: US 10,662,112 B2
(45) Date of Patent: *May 26, 2020

(54) METHOD AND SYSTEM FOR ON-LINE BLENDING OF FOAMING AGENT WITH FOAM MODIFIER FOR ADDITION TO CEMENTITIOUS SLURRIES

(71) Applicant: United States Gypsum Company, Chicago, IL (US)

(72) Inventors: Annamaria Vilinska, Chicago, IL (US); Alfred C. Li, Naperville, IL (US); Weixin D. Song, Vernon Hills, IL (US)

(73) Assignee: United States Gypsum Company, Chicago, IL (US)

(*) Notice: Subject to any disclaimer, the term of this patent is extended or adjusted under 35 U.S.C. 154(b) by 334 days.

This patent is subject to a terminal disclaimer.

(21) Appl. No.: 15/431,444

(22) Filed: Feb. 13, 2017

(65) Prior Publication Data
US 2017/0152177 A1    Jun. 1, 2017

Related U.S. Application Data

(63) Continuation-in-part of application No. 15/186,336, filed on Jun. 17, 2016, and a continuation-in-part of application No. 15/186,320, filed on Jun. 17, 2016.
(Continued)

(51) Int. Cl.
*C04B 28/14* (2006.01)
*B28C 7/04* (2006.01)
(Continued)

(52) U.S. Cl.
CPC ............... *C04B 28/14* (2013.01); *B28C 5/06* (2013.01); *B28C 5/1269* (2013.01);
(Continued)

(58) Field of Classification Search
CPC .................................................. C04B 2103/48
See application file for complete search history.

(56) References Cited

U.S. PATENT DOCUMENTS

1,660,243 A    2/1928 Thomson
1,702,729 A    2/1929 Hite
(Continued)

FOREIGN PATENT DOCUMENTS

AT    406048 B    1/2000
CN    1238312 A    12/1999
(Continued)

OTHER PUBLICATIONS

Burrows, "A Decade's Experience of Gypsum Board Weight Reduction in the U.S.", 14. Internationale Baustofftagung 1.0197-1.0207 (Weimar, Sep. 20-23, 2000).
(Continued)

*Primary Examiner* — Scott W Dodds
(74) *Attorney, Agent, or Firm* — Leydig, Voit & Mayer, Ltd.; Philip T. Petti; Pradip K. Sahu

(57) ABSTRACT

Disclosed is a method and system for blending a foam modifier with foaming agent online, e.g., as may be particularly useful for gypsum or cement slurries. The foam modifier comprises a fatty alcohol that is added to a gypsum or cement slurry that includes foaming agent, such as an alkyl sulfate surfactant. The fatty alcohol can be a $C_6$-$C_{16}$ fatty alcohol in some embodiments. The use of such a foam modifier can be used, for example, to stabilize the foam, reduce waste of foaming agent, improve void size control in the final product, and improve the gypsum board manufacturing process.

12 Claims, 14 Drawing Sheets

Related U.S. Application Data

(60) Provisional application No. 62/235,979, filed on Oct. 1, 2015.

(51) Int. Cl.

| | | |
|---|---|---|
| *B32B 13/08* | (2006.01) | |
| *C04B 28/02* | (2006.01) | |
| *C04B 38/10* | (2006.01) | |
| *B28C 5/06* | (2006.01) | |
| *B32B 13/04* | (2006.01) | |
| *B32B 3/26* | (2006.01) | |
| *B32B 13/14* | (2006.01) | |
| *B28C 5/12* | (2006.01) | |
| *B32B 5/24* | (2006.01) | |
| *B32B 13/02* | (2006.01) | |
| *B32B 5/20* | (2006.01) | |
| *E04C 2/04* | (2006.01) | |
| *C04B 103/48* | (2006.01) | |
| *C04B 111/00* | (2006.01) | |
| *B28B 19/00* | (2006.01) | |

(52) U.S. Cl.
CPC .......... *B28C 7/0413* (2013.01); *B28C 7/0418* (2013.01); *B32B 3/26* (2013.01); *B32B 5/20* (2013.01); *B32B 5/245* (2013.01); *B32B 13/02* (2013.01); *B32B 13/04* (2013.01); *B32B 13/08* (2013.01); *B32B 13/14* (2013.01); *C04B 28/02* (2013.01); *C04B 38/106* (2013.01); *E04C 2/049* (2013.01); *B28B 19/0092* (2013.01); *B32B 2250/03* (2013.01); *B32B 2250/40* (2013.01); *B32B 2262/101* (2013.01); *B32B 2262/105* (2013.01); *B32B 2264/10* (2013.01); *B32B 2264/102* (2013.01); *B32B 2266/049* (2016.11); *B32B 2307/304* (2013.01); *B32B 2307/3065* (2013.01); *B32B 2307/536* (2013.01); *B32B 2307/546* (2013.01); *B32B 2307/718* (2013.01); *B32B 2307/7145* (2013.01); *B32B 2307/72* (2013.01); *B32B 2307/728* (2013.01); *B32B 2307/732* (2013.01); *B32B 2607/02* (2013.01); *C04B 2103/48* (2013.01); *C04B 2111/0062* (2013.01)

(56) References Cited

U.S. PATENT DOCUMENTS

| | | |
|---|---|---|
| 2,017,022 A | 10/1935 | Roos |
| 2,080,009 A | 5/1937 | Roos |
| 2,639,901 A | 5/1953 | Teale |
| 2,762,738 A | 9/1956 | Teale |
| 2,965,528 A | 12/1960 | Loechl |
| 2,985,219 A | 5/1961 | Summerfield |
| 3,179,529 A | 4/1965 | Hickey et al. |
| 3,343,818 A | 9/1967 | Plemons et al. |
| 3,454,688 A | 7/1969 | Foster et al. |
| 3,456,920 A | 8/1969 | McCleary et al. |
| 3,532,576 A | 10/1970 | Proctor et al. |
| 3,573,947 A | 4/1971 | Kinkade et al. |
| 3,625,724 A | 12/1971 | Alvero |
| 3,912,528 A | 10/1975 | Doan et al. |
| 3,926,650 A | 12/1975 | Lange et al. |
| 3,929,947 A | 12/1975 | Schwartz et al. |
| 4,057,443 A | 11/1977 | Stiling et al. |
| 4,127,628 A | 11/1978 | Uchida et al. |
| 4,156,615 A | 5/1979 | Cukier |
| 4,184,887 A | 1/1980 | Lange et al. |
| 4,195,109 A | 3/1980 | Long |
| 4,237,260 A | 12/1980 | Lange et al. |
| 4,279,673 A | 7/1981 | White et al. |
| 4,392,896 A | 7/1983 | Sakakibara |
| 4,455,271 A | 6/1984 | Johnson |
| 4,518,652 A | 5/1985 | Willoughby |
| 4,618,370 A | 10/1986 | Green et al. |
| 4,673,543 A | 6/1987 | Akasaka et al. |
| 4,676,835 A | 6/1987 | Green et al. |
| 4,678,515 A | 7/1987 | Green et al. |
| 4,735,755 A | 4/1988 | Bischops |
| 4,965,031 A | 10/1990 | Conroy |
| 5,085,929 A | 2/1992 | Bruce et al. |
| 5,158,612 A | 10/1992 | Savoly et al. |
| 5,227,100 A | 7/1993 | Koslowski et al. |
| 5,240,639 A | 8/1993 | Diez et al. |
| 5,466,393 A | 11/1995 | Dietz et al. |
| 5,534,059 A | 7/1996 | Immordino, Jr. |
| 5,575,844 A | 11/1996 | Bradshaw |
| 5,643,510 A | 7/1997 | Sucech |
| 5,683,635 A | 11/1997 | Sucech et al. |
| 5,714,001 A | 2/1998 | Savoly et al. |
| 5,806,594 A * | 9/1998 | Stiles .................. C04B 28/146 106/722 |
| 6,340,388 B1 | 1/2002 | Luongo |
| 6,342,284 B1 | 1/2002 | Yu et al. |
| 6,387,172 B1 | 5/2002 | Yu et al. |
| 6,398,864 B1 | 6/2002 | Przybysz et al. |
| 6,406,537 B1 | 6/2002 | Immordino |
| 6,409,819 B1 | 6/2002 | Ko |
| 6,409,824 B1 | 6/2002 | Veeramasuneni et al. |
| 6,409,825 B1 | 6/2002 | Yu et al. |
| 6,481,171 B2 | 11/2002 | Yu et al. |
| 6,494,609 B1 | 12/2002 | Wittbold et al. |
| 6,572,698 B1 | 6/2003 | Ko |
| 6,613,424 B1 | 9/2003 | Putt et al. |
| 6,632,550 B1 | 10/2003 | Yu et al. |
| 6,746,781 B2 | 6/2004 | Francis et al. |
| 6,774,146 B2 | 8/2004 | Savoly et al. |
| 6,783,587 B2 | 8/2004 | Sethuraman et al. |
| 6,800,131 B2 | 10/2004 | Yu et al. |
| 6,815,049 B2 | 11/2004 | Veeramasuneni et al. |
| 6,822,033 B2 | 11/2004 | Yu et al. |
| 6,832,652 B1 | 12/2004 | Dillenbeck et al. |
| 6,874,930 B2 | 4/2005 | Wittbold et al. |
| 6,893,752 B2 | 5/2005 | Veeramasuneni et al. |
| 6,929,875 B2 | 8/2005 | Savoly et al. |
| 6,941,720 B2 | 9/2005 | DeFord et al. |
| 6,986,812 B2 | 1/2006 | Dubey et al. |
| 7,364,676 B2 | 4/2008 | Sucech et al. |
| 7,425,236 B2 | 9/2008 | Yu et al. |
| 7,445,738 B2 | 11/2008 | Dubey et al. |
| 7,455,728 B2 | 11/2008 | Losch et al. |
| 7,789,645 B2 | 9/2010 | Dubey et al. |
| 7,811,413 B2 | 10/2010 | Hennis et al. |
| 7,851,057 B2 | 12/2010 | Englert et al. |
| 8,204,698 B2 | 6/2012 | Li et al. |
| 8,216,360 B2 | 7/2012 | Gaillard et al. |
| 8,597,426 B2 | 12/2013 | Lee et al. |
| 8,702,881 B2 | 4/2014 | Yu et al. |
| 8,801,852 B2 | 8/2014 | Lee et al. |
| 9,181,132 B2 | 11/2015 | Lee et al. |
| 9,296,124 B2 | 3/2016 | Rago et al. |
| 2001/0001218 A1 | 5/2001 | Luongo |
| 2002/0017222 A1 | 2/2002 | Luongo |
| 2002/0139082 A1 | 10/2002 | DeFord et al. |
| 2003/0084980 A1 | 5/2003 | Seufert et al. |
| 2004/0026002 A1 | 2/2004 | Weldon et al. |
| 2004/0038065 A1 | 2/2004 | Francis |
| 2004/0092625 A1 | 5/2004 | Pollock et al. |
| 2004/0131714 A1 | 7/2004 | Burke |
| 2004/0231916 A1 | 11/2004 | Englert et al. |
| 2005/0019618 A1 | 1/2005 | Yu et al. |
| 2005/0061237 A1 | 3/2005 | Dubey et al. |
| 2005/0064164 A1 | 3/2005 | Dubey et al. |
| 2005/0142347 A1 | 6/2005 | Takahara et al. |
| 2005/0223949 A1 | 10/2005 | Bailey et al. |
| 2006/0196391 A1 | 9/2006 | Hassan et al. |
| 2006/0278133 A1 | 12/2006 | Yu et al. |
| 2007/0048490 A1 | 3/2007 | Yu et al. |
| 2007/0059513 A1 | 3/2007 | Yu et al. |
| 2007/0082170 A1 | 4/2007 | Colbert et al. |
| 2007/0102237 A1 | 5/2007 | Baig |
| 2008/0087366 A1 | 4/2008 | Yu et al. |

(56) References Cited

U.S. PATENT DOCUMENTS

| | | |
|---|---|---|
| 2008/0202415 A1 | 8/2008 | Miller et al. |
| 2009/0011212 A1 | 1/2009 | Dubey et al. |
| 2010/0246312 A1 | 9/2010 | Welker et al. |
| 2010/0247937 A1 | 9/2010 | Liu et al. |
| 2011/0046898 A1 | 2/2011 | Li et al. |
| 2011/0054053 A1 | 3/2011 | Lee et al. |
| 2012/0167805 A1 | 7/2012 | Wittbold et al. |
| 2012/0168527 A1 | 7/2012 | Li et al. |
| 2012/0170403 A1 | 7/2012 | Li et al. |
| 2012/0207989 A1 | 8/2012 | Xu et al. |
| 2013/0100759 A1 | 4/2013 | Wittbold et al. |
| 2013/0216717 A1 | 8/2013 | Rago et al. |
| 2013/0216762 A1 | 8/2013 | Chan et al. |
| 2013/0308411 A1 | 11/2013 | Wittbold et al. |
| 2014/0073711 A1 | 3/2014 | Lee et al. |
| 2014/0113124 A1 | 4/2014 | Sang et al. |
| 2014/0322395 A1 | 10/2014 | Thompson |
| 2014/0335365 A1 | 11/2014 | Wada et al. |
| 2015/0010767 A1 | 1/2015 | Sang et al. |
| 2015/0266270 A1 | 9/2015 | Yu et al. |
| 2016/0060168 A1 | 3/2016 | Stav et al. |
| 2017/0036962 A1* | 2/2017 | von der Schulenburg-Wolfsburg ............... E04B 1/80 |

FOREIGN PATENT DOCUMENTS

| | | |
|---|---|---|
| CN | 1396138 A | 2/2003 |
| DE | 3807250 A1 | 9/1988 |
| DE | 4316518 A1 | 11/1994 |
| EP | 0335405 A2 | 10/1989 |
| EP | 613764 A1 | 9/1994 |
| EP | 1008568 A1 | 6/2000 |
| FR | 2673620 A1 | 9/1992 |
| FR | 2963002 A1 | 1/2012 |
| GB | 1028890 A | 5/1966 |
| GB | 1561232 A | 2/1980 |
| JP | H03-50168 A | 3/1991 |
| JP | H06-23721 A | 2/1994 |
| JP | 2006-069815 A | 3/2006 |
| NO | 126524 B | 2/1973 |
| SU | 967996 A1 | 10/1982 |
| SU | 1291585 A1 | 2/1987 |
| WO | WO 1995/016515 A1 | 6/1995 |
| WO | WO 1996/026166 A1 | 8/1996 |
| WO | WO 2001/045932 A1 | 6/2001 |
| WO | WO 2001/081263 A1 | 11/2001 |
| WO | WO 2002/031287 A1 | 4/2002 |
| WO | WO 2008/139439 A2 | 11/2008 |
| WO | WO 2014/066207 A1 | 5/2014 |
| WO | WO 2014/066283 A1 | 5/2014 |

OTHER PUBLICATIONS

Deffenbaugh et al. "Comparison of Starch Pasting Properties in the Brabender Viscoamylograph and the Rapid Visco-Analyzer," *Cereal Chemistry*, vol. 66, No. 6, pp. 493-499 (1989).

Diloflo® GW Products Bulletin, "Polynaphthalene Sulfonate, Sodium Salt", GEO Specialty Chemicals, Horsham, PA (Nov. 1999).

Global Gypsum Magazine, "Gypsum Process Engineering Industrial and Thermal Equipment" 7 pages (Nov. 2012).

Hyonic PFM33 Productes Buletin, "Zero VOC Foaming Agent for Gypsum Wallboard", GEO Specialty Chemicals, Horsham, PA (Jul. 2000).

Okada et al., "Foaming agents for aerated lightweight concrete" *Chemical Abstracts*, 115(14): 326 (Oct. 7, 1991).

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).

Shiao et al. "Chain length compatibility effects in mixed surfactant systems for technological applications" *Adv. Colloid Interface Sci.* 74: 1-29 (1998).

"Standard Test Methods for Physical Testing of Gypsum Panel Products", Annual Book of ASTM Standards, Designations: C 473-97, vol. 04:01 pp. 253-263 (1998).

European Patent Office, International Search Report and the Written Opinion in International Application No. PCT/US2016/038885 (dated Oct. 4, 2016).

European Patent Office, International Search Report and the Written Opinion in International Application No. PCT/US2017/024677 (dated Jun. 30, 2017).

* cited by examiner

METHOD AND SYSTEM FOR ON-LINE BLENDING OF FOAMING AGENT WITH FOAM MODIFIER FOR ADDITION TO CEMENTITIOUS SLURRIES

CROSS-REFERENCE TO RELATED APPLICATIONS

This patent application is a continuation in part of U.S. patent application Ser. Nos. 15/186,320 and 15/186,336, which both were filed on Jun. 17, 2016 and claim the benefit of U.S. Provisional Patent Application No. 62/235,979, filed Oct. 1, 2015, all of which prior applications are hereby incorporated by reference.

BACKGROUND OF THE INVENTION

Set gypsum (i.e., calcium sulfate dihydrate) is a well-known material that is used in many products, including panels and other products for building construction and remodeling. One such panel (often referred to as gypsum board) is in the form of a set gypsum core sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

During manufacture of the board, stucco (i.e., calcined gypsum in the form of calcium sulfate hemihydrate and/or calcium sulfate anhydrite), water, and other ingredients as appropriate are mixed, typically in a pin mixer as the term is used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is required (e.g., in a kiln) to drive off the remaining free (i.e., unreacted) water to yield a dry product.

A reduction in board weight is desired because of higher efficiencies in installation. For example, lifting demands are much less, which results in longer work days and less injuries. Lighter weight board is also more "green," as it can result in reducing transportation expenditures and energy consumption. To reduce the weight of the board, foaming agent can be introduced into the slurry to form air voids in the final product. However, by their nature, foaming agents are generally unstable such that foam bubbles tend to break up easily, particularly in the presence of cementitious material, thereby leading to waste and inefficiencies.

Furthermore, replacing mass with air in the gypsum board envelope reduces weight, but that loss of mass also results in less strength. Compensating for that loss in strength is a significant obstacle in weight reduction efforts in the art.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of any embodiments of the disclosure to solve any specific problem noted herein.

BRIEF SUMMARY

In one aspect, the disclosure provides for "on-line" blending of foaming agent (soap) and foam modifier (soap modifier) to form a blended pre-mix foam stream in a manner that allows for the relative weight amounts of the foaming agent and foam modifier to be adjusted. For example, the foam has particular utility in the manufacture of foamed gypsum or cement board. The foam, which will result in voids in the dried product, is used so that the board is made lighter. The on-line blending allows for adjustments to the amounts of foaming agent(s) and foam modifier directly at the gypsum wallboard or cement board manufacturing facility. This flexibility is advantageous because it allows for tailoring the properties of the board end product, e.g., with respect to the board structure, including the size and arrangement of voids in a board layer containing voids formed from the foam.

Thus, a method of making a foamed cementitious board comprises, consists of, or consists essentially of blending a first amount of a first foaming agent, a second amount of a second foaming agent, and a third amount of a fatty alcohol to form a blended stream, wherein the first, second, and third amounts are in a first weight ratio. In this step, the first or second foaming agent can be combined with the fatty alcohol first in a pre-stream and then added to the blended stream, e.g., in a blended stream conduit. The method also comprises controllably changing the first, second, and/or third amounts to form a second weight ratio, which is different than the first weight ratio. The method further comprises inserting air into the blended stream to form foam; mixing at least water, cementitious material, and the foam to form a slurry; disposing the slurry between a first cover sheet and a second cover sheet to form a board precursor; cutting the board precursor into a board; and drying the board.

In another aspect, a system for forming foam is provided. The system comprises, consists of, or consists essentially of a flow metering system configured to introduce a first foaming agent, a second foaming agent, and fatty alcohol, irrespective of order, directly or indirectly into a foam generator. In some embodiments, the first foaming agent, second foaming agent, and fatty alcohol are combined, regardless of order, prior to addition to the foam generator, e.g., in a blended stream conduit. In some embodiments, the first foaming agent or second foaming agent is mixed with the fatty alcohol first, e.g., in a pre-conduit prior to delivery to the blended stream conduit. A controller communicates with the flow metering system to selectively change the relative amounts of first foaming agent, second foaming agent, and fatty alcohol that are introduced directly or indirectly into the foam generator (e.g., via the blended stream conduit). An air supply conduit is provided to introduce air into the foam generator adapted to form foam.

In another aspect, a system for forming foam is provided. The system comprises, consists of or consists essentially of a flow metering system comprising at least one pump operatively associated with one or more valve for controlling flow of a first foaming agent, a second foaming agent, and fatty alcohol into a blended stream conduit, irrespective of order. A controller communicates with the low metering system to selectively change the relative amounts of first foaming agent, second foaming agent, and fatty alcohol that are introduced into the blended stream conduit. A foam generator is in fluid communication with the blended stream conduit, and an air supply conduit introduces air into the foam generator so that foam can be prepared.

In another aspect, a system for forming foam is provided. The system comprises, consists of, or consists essentially of a first pump which is used to introduce a first foaming agent from a first supply conduit via a first valve into a blended stream conduit. A second pump is used to introduce a second foaming agent from a second supply conduit via a second valve into the blended stream conduit. A third pump is used to introduce fatty alcohol from a third supply conduit via a third valve into the blended stream conduit. A controller communicates with one or more (e.g., all) of the first, second, and third valves and/or first, second and third pumps to selectively change the relative amounts of first foaming agent, second foaming agent, and fatty alcohol that are introduced into the blended stream conduit. A foam generator, containing agitation means, communicates with the blended stream conduit. An air supply conduit introduces air into the foam generator. Thus, as the contents of the blended stream are agitated and combined with air in the foam generator, foam is formed. The foam can then be delivered to a cementitious slurry, e.g., into a mixer where the cementitious slurry is continuously formed, for the preparation of board such as gypsum wallboard or cement board.

In another aspect, the disclosure provides a gypsum board comprising, consisting of, or consisting essentially of a set gypsum core disposed between two cover sheets. The set gypsum core comprises, consists of, or consists essentially of a gypsum crystal matrix formed from at least water, stucco, and a foam. The foam is formed from a foaming agent, and foam stabilizer comprising a fatty alcohol. Preferably, the foaming agent comprises, consists of, or consists essentially of at least one alkyl sulfate, at least one alkyl ether sulfate, or any combination thereof in some embodiments, the foaming agent substantially excludes an olefin and/or alkyne foaming agent. Without wishing to be bound by any particular theory, the fatty alcohol is believed to interact with the foaming agent to stabilize the foam and allow for better control of the air voids formed in the final product. In some embodiments, the foam stabilizer comprises the fatty alcohol but substantially excludes fatty acid alkyloamides and/or carboxylic acid taurides. In some embodiments, the board exhibits enhanced strength as compared with the same board prepared without the fatty alcohol.

In another aspect, the disclosure provides a method of making cementitious (e.g., gypsum or cement) board. Foam is typically pregenerated. Thus, the method comprises, consists of, or consists essentially of pregenerating a foam by inserting air into an aqueous mixture of foaming agent and a foam stabilizer comprising fatty alcohol. Preferably, the foaming agent comprises, consists of, or consists essentially of at least one alkyl sulfate, at least one alkyl ether sulfate, or any combination thereof. Stable and unstable foaming agents can be blended. In some embodiments, the foaming agent substantially excludes an olefin and/or alkyne foaming agent. The foam is introduced (e.g., injected) into the slurry.

The method includes mixing at least water, stucco, and the foam to form a cementitious slurry; disposing the slurry between a first cover sheet and a second cover sheet to form a board precursor; cutting, the board precursor into a board; and drying the board. In preferred embodiments, the fatty alcohol can be combined with the foaming agent in a pre-mix and the pre-mix added to stucco, water, and other additives, as desired, e.g., in a mixer. While not wishing to be bound by theory, the fatty alcohol is believed to be generally solubilized in the aqueous foaming agent. In some embodiments, the foam stabilizer comprises the fatty alcohol but substantially excludes a glycol and/or amide compound.

In another aspect, the disclosure provides a method of forming a foamed gypsum slurry. The method comprises, consists of, or consists essentially of combining a foaming agent with a fatty alcohol to form an aqueous soap mixture; generating a foam from the aqueous soap mixture; and adding the foam to a gypsum slurry comprising stucco and water to form the foamed gypsum slurry. Without wishing to be bound by any particular theory, as the foam is entrained in the gypsum slurry, foam bubbles are formed with a shell surrounding the bubbles interfacing the slurry. It is further believed that the presence of fatty alcohol desirably stabilizes the shell at the interface.

In another aspect, the disclosure provides a slurry comprising, consisting, or consisting essentially of water, stucco, foaming agent, and a fatty alcohol, wherein, when the slurry is cast and dried as board, the board has increased strength compared to the same board formed without the fatty alcohol.

In another aspect, the disclosure provides a method of stabilizing a foamed structure in a cementitious slurry, e.g., used in the preparation of cementitious (e.g., gypsum or cement) board. In the method, fatty alcohol can be combined with foaming agent. In some embodiments, the foaming agent is mixed with the fatty alcohol to form an aqueous soap mixture. A foam is generated from the aqueous soap mixture. The foam is added to a gypsum or cement slurry comprising cementitious material (e.g., stucco or cement) and water to form a foamed cementitious slurry. Without wishing to be bound by any particular theory, it is believed that, as the foam is entrained in the cementitious slurry, foam bubbles are formed with a shell surrounding the bubbles interfacing the slurry. It is further believed that the presence of fatty alcohol desirably stabilizes the shell at the interface.

To make the board, the foamed cementitious slurry is applied in a bonding relation to a top (or face) cover sheet to form a foamed cementitious core slurry having first and second major surfaces. The first major surface of the foamed cementitious core slurry faces the top cover sheet. A bottom (or back) cover sheet is applied in bonding relation to the second major surface of the foamed cementitious core slurry to form a wet assembly of board precursor. If desired, a skim coat can be applied between the core and either or both of the cover sheets. The board precursor is cut and dried to form the board product.

In another aspect, the disclosure provides cement board formed from a core mix of water and a cement material (e.g., Portland cement, alumina cement, magnesia cement, etc., and blends of such materials). A foaming agent and fatty alcohol is also included in the mix. Optionally, light-weight aggregate (e.g., expanded clay, expanded slag, expanded shale, perlite, expanded glass beads, polystyrene beads, and the like) can be included in the mix in some embodiments. The cement board comprises a cement core disposed between two cover sheets. The cement core can be formed from at least water, cement, foaming agent, and a fatty alcohol.

In another aspect, the disclosure provides a method of forming a foamed cement slurry. The method comprises, consists of or consists essentially of combining a foaming agent with a fatty alcohol to form an aqueous soap mixture;

generating a foam from the aqueous soap mixture; and adding the foam to a cement slurry comprising cement (e.g., Portland cement, alumina cement, magnesia cement, etc., or combinations thereof) and water to form the foamed cement slurry. As the foam is entrained in the cement slurry, foam bubbles are formed with a shell surrounding the bubbles interfacing the slurry. Without wishing to be bound by any particular theory, the presence of fatty alcohol desirably stabilizes the shell at the interface.

In another aspect, the disclosure provides a stony comprising, consisting, or consisting essentially of water, cement, foaming agent, and a fatty alcohol, wherein, when the slurry is formed and dried as board, the board has increased strength compared to the same board formed without the fatty alcohol.

DETAILED DESCRIPTION OF THE INVENTION

Figure 1:
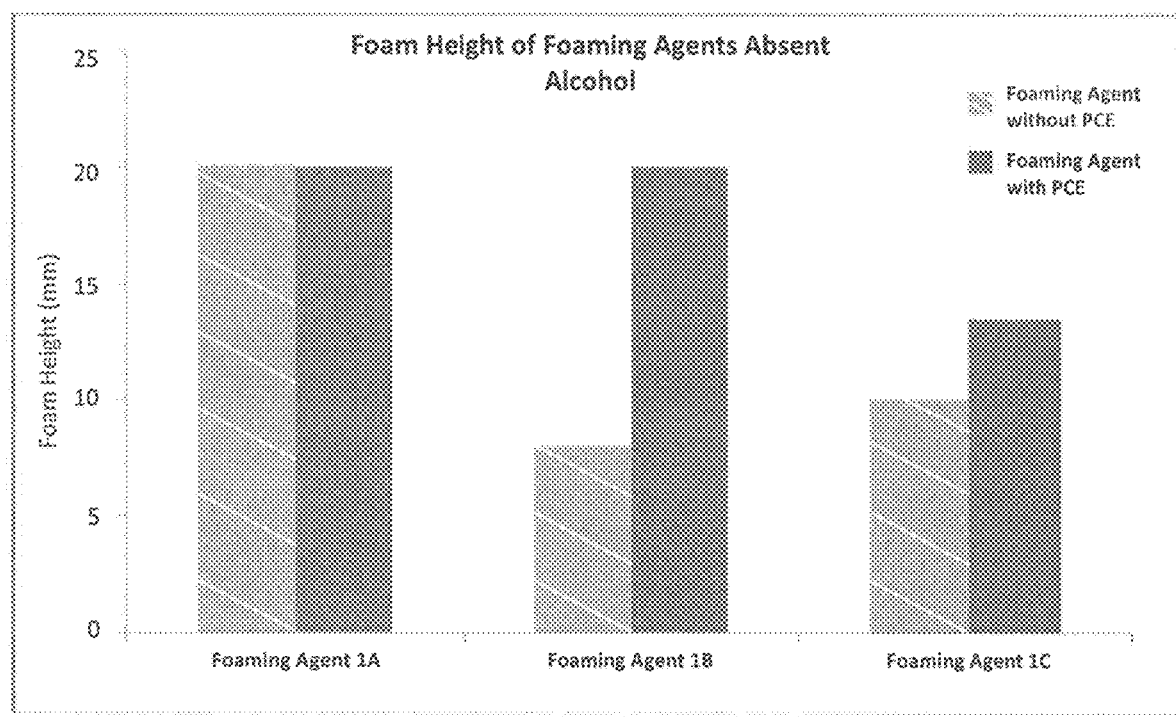
FIG. 1 is a bar graph of foam height (mm) (Y-Axis) versus foaming agent solutions absent fatty alcohol (X-axis) both with and without polycarboxylate ether, as described in Example 1 herein.

Embodiments of the disclosure provide a foam modifier useful for cementitious slurries (e.g., gypsum or cement slurries), and for related products and methods. The foam modifier is a fatty alcohol, which, while not wishing to be bound by any particular theory, is believed to act to help stabilize foam. Gypsum and cement slurries can be complex systems with varying types and amounts of materials. The ingredients within the slurry contribute stress to foam, which can cause foam bubbles to break up, resulting in reduced control of air void size distribution. Surprisingly and unexpectedly, the inventors have found that inclusion of the fatty alcohol with the foaming agent, e.g., in a pre-mix to prepare the foam, can result in an improvement in the stability of the foam, thereby allowing better control of foam (air) void size and distribution. By forming such a robust foaming system, in some embodiments the controlled core structure can result in improved board strength, as seen in, e.g., improved nail pull resistance (sometimes referred to simply as "nail pull"), core hardness, etc. In some embodiments, the board has increased strength compared to the same board formed without the fatty alcohol. The air void size distribution of the core structure can be tailored as desired, e.g., to have an average void diameter that can be higher or lower, e.g., comprising larger air voids or smaller air voids, as can be predetermined.

The fatty alcohol can be used with any suitable foaming agent composition useful for generating foam in gypsum slurries. Suitable foaming agents are selected to result in air voids in the final product such that the weight of the board core can be reduced. In some embodiments, the foaming agent comprises a stable soap, an unstable soap, or a combination of stable and unstable soaps. In some embodiments, one component of the foaming agent is a stable soap, and the other component is a combination of a stable soap and unstable soap. In some embodiments, the foaming agent comprises an alkyl sulfite surfactant.

Many commercially known foaming agents are available and can be used in accordance with embodiments of the disclosure, such as the HYONIC line (e.g., 25AS) of soap products from GEO Specialty Chemicals, Ambler, Pa. Other commercially available soaps include the Polystep B25, from Stepan Company, Northfield, Ill. The foaming agents described herein can be used alone or in combination with other foaming agents.

Some types of unstable soaps, in accordance with embodiments of the disclosure, are alkyl sulfate surfactants with varying chain length and varying cations. Suitable chain lengths, can be, for example, $C_8$-$C_{12}$, e.g., $C_8$-$C_{10}$, car $C_{10}$-$C_{12}$. Suitable cations include, for example, sodium, turimonium, magnesium, or potassium. Examples of unstable soaps include, for example, sodium dodecyl sulfate, magnesium dodecyl sulfate, sodium decyl sulfate, ammonium dodecyl sulfate, potassium dodecyl sulfate, potassium decyl sulfate, sodium octyl sulfate, magnesium decyl sulfate, ammonium decyl sulfate, blends thereof, and any combination thereof.

Some types of stable soaps, in accordance with embodiments of the disclosure, are alkoxylated (e.g., ethoxylated) alkyl sulfate surfactants with varying (generally longer) chain length and varying cations. Suitable chain lengths, can be, for example, $C_{10}$-$C_{14}$, e.g., $C_{12}$-$C_{14}$, or $C_{10}$-$C_{12}$. Suitable cations include, for example, sodium, ammonium, magnesium, or potassium. Examples of stable soaps include, for example, sodium laureth sulfate, potassium laureth sulfate, magnesium laureth sulfate, ammonium laureth sulfate, blends thereof, and any combination thereof. In some embodiments, an combination of stable and unstable soaps from these lists can be used.

Examples of combinations of foaming agents and their addition in preparation of foamed gypsum products are disclosed in U.S. Pat. No. 5,643,510, herein incorporated by reference. For example, a first foaming agent which forms a stable foam and a second foaming agent which forms an unstable foam can be combined, in some embodiments, the first foaming agent is a soap with an alkyl chain length of 8-12 carbon atoms and an alkoxy (e.g., ethoxy) group chain length of 1-4 units. The second foaming agent is optionally an unalkoxylated (e.g., unethoxylated) soap with an alkyl chain length of 6-20 carbon atoms, e.g., 6-18 carbon atoms or 6-16 carbon atoms. Regulating the respective amounts of these two soaps allows for control of the board foam structure until about 100% stable soap or about 100% unstable soap is reached.

In some embodiments, the foaming agent is in the form of an alkyl sulfate and/or alkyl ether sulfate. Such foaming agents are preferred over olefins such as olefin sulfates because the olefins contain double bonds, generally at the front of the molecule thereby making them undesirably more reactive, even when made to be a soap. Thus, preferably, the foaming agent comprises alkyl sulfate and/or alkyl ether sulfate but is essentially free of an olefin (e.g., olefin sulfate) and/or alkyne. Essentially free of olefin or alkyne means that the foaming agent contains either (i) 0 wt. % based on the weight of stucco, or no olefin and/or alkyne, or (ii) an ineffective or (iii) an immaterial amount of olefin and/or alkyne. An example of an ineffective amount is an amount below the threshold amount to achieve the intended purpose of using olefin and/or alkyne foaming agent, as one of ordinary skill in the art will appreciate. An immaterial amount may be, e.g., below about 0.001 wt. %, such as below about 0.005 wt. %, below about 0.001 wt. %, below about 0.0001 wt. %, etc., based on the weight of stucco, as one of ordinary skill in the art will appreciate.

The foaming agent is included in the gypsum slurry in any suitable amount. For example, in some embodiments, it is included in an amount of from about 0.01% to about 0.25% by weight of the stucco, e.g., from about 0.01% to about 0.1% by weight of the stucco, from about 0.01% to about 0.03% by weight of the stucco, or from about 0.07% to about 0.1% by weight of the stucco.

The fatty alcohol can be any suitable aliphatic fatty alcohol. It will be understood that, as defined herein throughout, "aliphatic" refers to alkyl, alkenyl, or alkynyl, and can be substituted or unsubstituted, branched or unbranched, and saturated or unsaturated, and in relation to some embodiments, is denoted by the carbon chains set forth herein, e.g., $C_x$-$C_y$, where x and y are integers. The term aliphatic thus also refers to chains with heteroatom substitution that preserves the hydrophobicity of the group. The fatty alcohol can be a single compound, or can be a combination of two or more compounds.

In some embodiments, the fatty alcohol is a $C_6$-$C_{20}$ fatty alcohol, such as a $C_{10}$-$C_{20}$ fatty alcohol or $C_6$-$C_{16}$ fatty alcohol (e.g., $C_6$-$C_{14}$, $C_6$-$C_{12}$, $C_6$-$C_{10}$, $C_6$-$C_8$, $C_8$-$C_{16}$, $C_8$-$C_{14}$, $C_8$-$C_{12}$, $C_8$-$C_{10}$, $C_{10}$-$C_{16}$, $C_{10}$-$C_{14}$, $C_{10}$-$C_{12}$, $C_{12}$-$C_{16}$, $C_{12}$-$C_{14}$, or $C_{14}$-$C_{16}$ aliphatic fatty alcohol, etc.). Examples include octanol, decanol, dodecanol, etc. or any combination thereof.

The $C_{10}$-$C_{20}$ fatty alcohol comprises a linear or branched $C_6$-$C_{20}$ carbon chain and at least one hydroxyl group. The hydroxyl group can be attached at any suitable position on the carbon chain but is preferably at or near either terminal carbon. In certain embodiments, the hydroxyl group can be attached at the α-, β-, or γ-position of the carbon chain, for example, the $C_6$-$C_{20}$ fatty alcohol can comprise the following structural subunits:

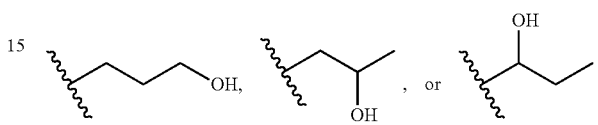

Thus, examples of a desired fatty alcohol in accordance with some embodiments are 1-dodecanol, 1-undecanol, 1-decanol, 1-nonanol, 1-octanol, or any combination thereof.

In some embodiments, a foam stabilizing agent comprises the fatty alcohol and is essentially free of fatty acid alkylo-amides or carboxylic acid taurides. In some embodiments, the foam stabilizing agent is essentially free of a glycol, although glycols can be included in some embodiments, e.g., to allow for higher surfactant content. Essentially free of any of the aforementioned ingredients means that the foam stabilizer contains either (i) 0 wt. % based on the weight of any of these ingredients, or (ii) an ineffective or (iii) an immaterial amount of any of these ingredients. An example of an ineffective amount is an amount below the threshold amount to achieve the intended purpose of using any of these ingredients, as one of ordinary skill in the art will appreciate. An immaterial amount may be, e.g., below about 0.0001 wt. %, such as below about 0.00005 wt. %, below about 0.00001 wt. %, below about 0.000001 wt. %, etc., based on the weight of stucco, as one of ordinary skill in the art will appreciate.

The fatty alcohol can be present in the gypsum slurry in any suitable amount. In some embodiments, the fatty alcohol is present in an amount of from about 0.0001% to about 0.03% by weight of the stucco, e.g., from about 0.0001% to about 0.001% by weight of the stucco, from about 0.0002% to about 0.0075% by weight of the stucco, from about 0.0001% to about 0.003% by weight of the stucco, or from about 0.0005% to about 0.001% by weight of the stucco.

In preferred embodiments, to enhance efficiency, the foaming agent, foam water, and fatty alcohol are combined prior to addition to the gypsum slurry. Preparation in this manner enables the fatty alcohol to act directly with the foam to provide the desired stabilization effect, rather than be diluted in the gypsum slurry and compete with other components of the slurry for access to foam bubbles.

The fatty alcohol can be added to foaming agent and typically dissolved. Since fatty alcohols are generally water insoluble, they are added to the soap and solubilized first prior to foam generation in some embodiments. The fatty alcohol can be dissolved in stable or unstable foaming agents in accordance with embodiments of the disclosure. In some embodiments, a first foaming agent, with dissolved fatty alcohol, is then blended with another foaming agent (e.g., a stable foaming agent with a dissolved fatty alcohol blended with an unstable foaming agent, or an unstable foaming agent with a dissolved fatty alcohol blended with a stable foaming agent).

Any effective weight proportion between the surfactants (foaming agents) and fatty alcohols can be used in the final foaming agent-fatty alcohol blend, prior to addition to the gypsum slurry. For example, the foaming agent can be present relative to fatty alcohol in a weight ratio of from about 5000:1 to about 5:1, e.g., from about 5000:1 to about 1000:1, from about 500:1 to about 100:1, or from about 500:1 to about 10:1. To illustrate, in one embodiment, a typical final foaming agent-fatty alcohol blend has 30% surfactants and 1% fatty alcohols by weight, with the remainder of the mixture composed of water.

The foaming agent and fatty alcohol can be blended in a container by mixing (stirring, agitation). The additional foaming agent can be added by injection. In accordance with preferred embodiments, the foam is pregenerated and prestabilized before it meets the cementitious slurry. While not wishing to be bound by theory, it is believed that a thin film of surfactant is formed which is modified with fatty alcohol before mixing it with the cementitious slurry. Pregeneration of the foam involves high shear mixing of pressurized air with soap solution. This pregeneration of foaming agent is preferred as it leads to a foam, which is in contrast with systems that merely entrain some air during mixing without making foams. These air entrainment systems merely add bubbles by simply blending the slurry containing some soap. A foam can be distinguished from such mixed bubble systems because pregenerated foam bubble size is more uniform and can be controlled.

After the foaming agent composition blend with fatty alcohol is combined, the foam is generated and then added (e.g., injected) to the slurry. Methods and apparatus for generating foam are well known. See, e.g., U.S. Pat. Nos. 4,518,652; 2,080,009; and 2,017,022. The foam can be pregenerated from the aqueous foaming agent-fatty alcohol mixture. For example, the final composition of the foaming agent and fatty alcohol combination can be directed via dosage adjustments to the foam generator equipment. One method of making the foam is using a foam generator that mixes the soap solution with air. Any method of mixing can be used to combine the soap with air that causes bubbles to be formed, including agitation, turbulent flow or mixing. For example, the foam generator equipment can include compressed air and surfactant solution mixed in order to generate the foam. The amount of water and air are controlled to generate foam of a particular density. Adjustment of the foam volume is used to control the overall dry product weight.

If desired, a mixture of foaming agents can be pre-blended "off-line", i.e., separate from the process of preparing the foamed gypsum product. However, it is preferable to blend the first and second foaming agents concurrently and continuously, as an integral "on-line" part of the mixing process. This can be accomplished, for example, by pumping separate streams of the different foaming agents and bringing the streams together at, or just prior to, a foam generator that is employed to generate the stream of aqueous foam which is then inserted into and mixed with the calcined gypsum slurry. By blending in this manner, the ratio of the first and second foaming agents in the blend can be simply and efficiently adjusted (for example, by changing the flow rate of one or both of the separate streams) to achieve the desired void characteristics in the foamed set gypsum product. Such adjustment will be made in response to an examination of the final product to determine whether such adjustment is needed. Further description of such "on-line" blending and adjusting can be found in U.S. Pat. Nos. 5,643,510 and 5,683,635, incorporated by reference.

On-line addition of the foam is advantageous in some embodiments because it allows for one or more soaps to be combined with the foam modifier as described herein in a pre-mix, which is then inserted into the gypsum slurry, e.g., in the main mixer for the gypsum slurry. Addition of the soap and soap (foam) modifier in this manner allows for flexibility in the system as the relative weights of each component can be adjusted, e.g., with the aid of a process controller as known in the art. Thus, the individual amounts of one or more soaps and the soap modifier can be controlled with better precision and allows for flexibility during manufacture that is not available from a combined source of soap (foaming agent) and soap modifier (foam modifier) prepared off-site with predetermined relative amounts of the respective components (i.e., soap and soap modifier).

Figure 14:
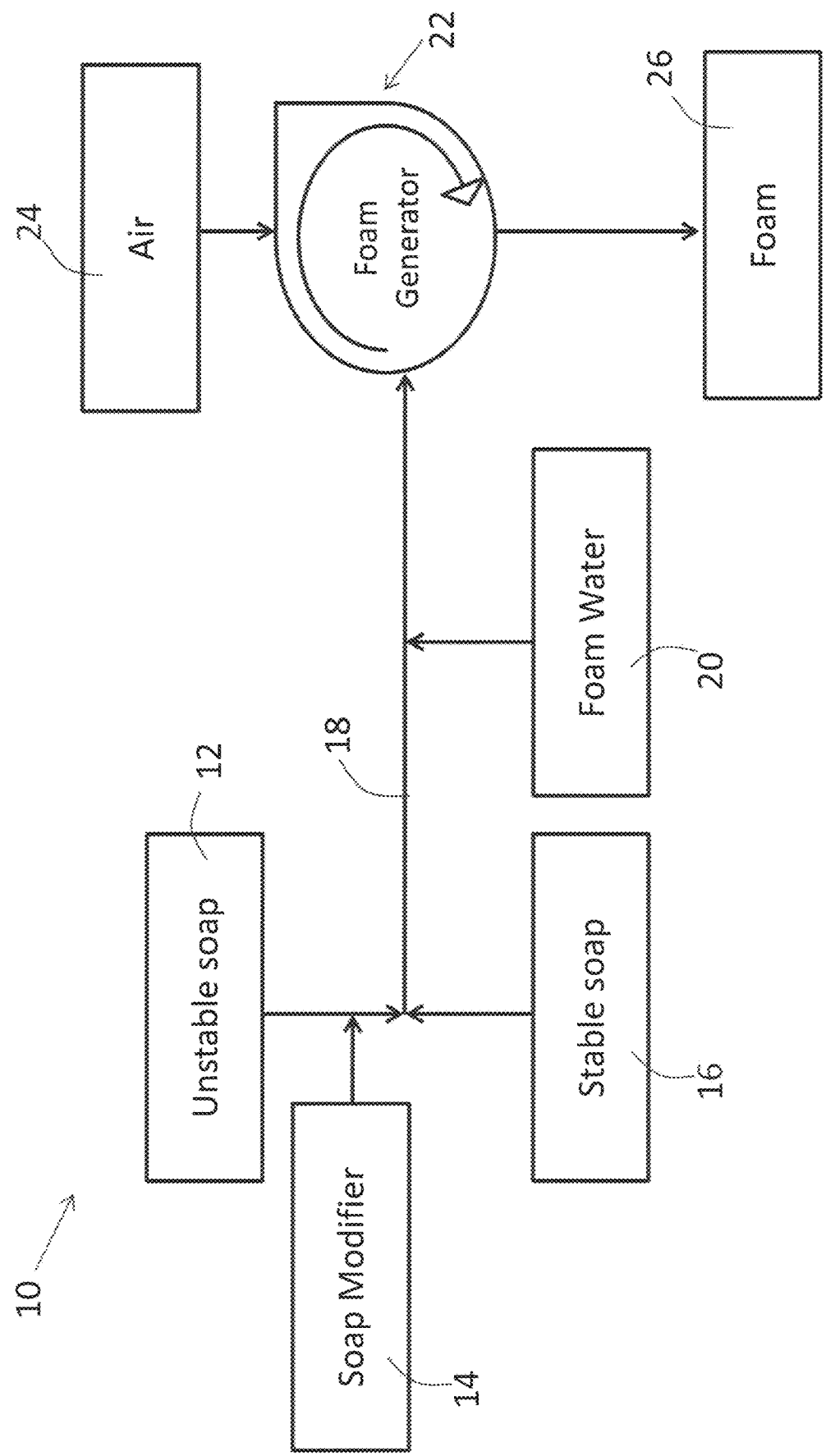
FIG. 14 is a schematic diagram of an embodiment of a system for preparing a foam that includes stable and unstable soaps (foaming agents) and soap (foam) modifier such that the foam is useful, for example, for insertion into a gypsum or cement slurry during the manufacture of board.

FIG. 14 is schematic flow diagram that illustrates an embodiment of a foam generating system 10 where the foaming agent (soap) and foam modifier (soap modifier) are combined in a pre-mix that can be adjusted with respect to the amounts of each component, in particular, an unstable soap 12, a soap modifier 14, and a stable soap 16, as described herein, are introduced through individual conduits in any order into a blended stream conduit 18. Foam water 20 can also be added into the blended stream conduit 18 in order to dilute the surfactant solution. Foam air 24 is introduced to achieve the desired target foam density (e.g., from about 2 lb/ft$^3$ to about 8 lb/ft$^3$, from about 3 lb/ft$^3$ to about 7 lb/ft$^3$, or from about 4 lb/ft$^3$ to about 6 lb/ft$^3$, etc.) as may be suitable for foam generation.

The contents of the blended stream conduit 18 are inserted into a foam generator 22. Clean, dry air 24 is also inserted into foam generator 22 and is used to form the foam 26. The foam generator 22 generally contains a rotor and stator, as known in the art. The foam generator mixes the air, water, and foaming agents under pressure using a shearing action between the rotor and stator to produce the foam. The air can be supplied through a conduit with precise control of air pressure (e.g., from about 40 psi to about 100 psi, or from about 40 psi to about 80 psi) and flow rate (e.g., from about 20 ft$^3$/min to about 60 ft$^3$/min, or from about 30 ft$^3$/min to about 50 ft$^3$/min). The foam 26 can then be delivered to a mixer for forming a cementitious slurry which is used to form board such as a gypsum board or cement board, as known in the art.

Advantageously, the system 10 allows for on-line adjustment of the components used in making the foam, particularly, the unstable soap 12, soap modifier 14, and stable soap 16. The unstable soap 12, soap modifier 14 and stable soap 16 can each be preformed and delivered through individual conduits to the blended stream conduit 18, if desired, the unstable soap 12 and the soap modifier 14 can be combined first in a pre-conduit and/or, similarly, the stable soap 16 and the soap modifier 14 can be combined first in a pre-conduit. Insertion of the components 12, 14, and 16 can be assisted by a flow metering system as described below.

The system 10 allows for on-the-fly adjustment of the relative amounts of each component 12, 14, and 16, even as the foam generating system is continuously forming foam and the cementitious slurry mixer is continuously forming board. To illustrate, the components 12, 14, and 16 can be present in a first weight ratio but an operator (e.g., a board line operator) can adjust the amounts of one or more of components 12, 14 and 16 so as to form a second weight ratio, all on the fly while the foam and, in turn, the board, are continuously prepared. For example, the operator may wish to change the relative amounts of components 12, 14 and 16 in order to achieve a target air void structure in the board layer and to control the void size distribution as known in the art. This may be in response to a visual inspection of a sample of wet slurry and/or a cross-section of board sampled downstream (for example, in wet form, e.g. at the knife, or after drying), and particularly by inspection of a gypsum layer containing voids resulting from the foam.

The flow metering system can include one or more pumps and one or more valves in some embodiments. For example, one or more pumps (e.g., progressive cavity or positive displacement pumps) can be used to facilitate injection of the particular foaming agent or foam modifier component into the blended stream conduit 18. In some embodiments, the pumps are in the form of high precision pumps and contain a flow-meter in order to quantify the material flow. Valves or other flow regulator are used to regulate the amount of each component 12, 14, and 16 injected into the blended stream conduit 18. Any suitable valves can be utilized as known in the art, such as solenoid or pulsing valves (e.g., valves that pulse with modulation).

In various embodiments, the flow metering system can be configured so that one, two, or three pumps are operatively associated with valves for the first foaming agent, second foaming agent, and foam modifier. For example, in some embodiments, three pumps are employed, one for each of the first foaming agent, the second foaming agent, and the foam modifier. In some embodiments, such as where one of the two foaming agents is combined with the foam modifier first prior to addition to the other foaming agent, two pumps can be used, e.g., where one pump is used for two ingredients that are combined first, and the other pump is used for the third ingredient. In other embodiments, a single pump is used and is adapted for injection of the first foaming agent, the second foaming agent, and the foam modifier.

A process controller can be utilized to operate the flow metering system for on-line adjustments in some embodiments. The process controller can communicate with the pumps and/or valves of the flow metering system to adjust the amounts of first foaming agent, second foaming agent, and foam modifier. Hardware and operating systems for operating the flow metering system using pumps and valves are well known. Briefly, the controller can be in the form of a chip or electronic control unit and can be associated with a computer module provided with memory in some embodiments. The valves and pumps can have automated settings for one or more desired features, e.g., on/off, rate of pulsing, actuation rate, flow rate, flow pressure, etc., which can be installed, for example, in the memory of the module. The controller can receive instructions, e.g., from a human operator, and responsively send a control output signal to the valves and/or pumps, e.g., through the settings thereof. This allows for on-line adjustments of the amounts of one or more of components 12, 14 and 16 as the pumps and/or valves can adjust one or more of the flow rate, flow pressure, rate of pulsing, actuation rate, etc., as will be appreciated by one of ordinary skill in the art.

The slurry and pregenerated foam can be combined to make a foamed gypsum composition. One method of combining the gypsum slurry and the pregenerated foam is by pressurizing the foam and forcing it into the slurry. At least one embodiment uses a foam ring to distribute the foam. The foam ring is a shaped apparatus that allows the slurry to flow through it. It includes one or more jets or slots for discharge of the pressurized foam into the slurry as the slurry passes the ring. Use of a foam ring is disclosed in U.S. Pat. No. 6,494,609, herein incorporated by reference. Another method of combining the foam and the slurry is by addition of the foam directly to the mixer. In one embodiment, a foam ring or other foam injecting apparatus is oriented to inject foam into the discharge conduit of the mixer. This process is described in commonly-assigned U.S. Pat. No. 5,683,635, incorporated by reference. Regardless of the way that the foam is generated or introduced into the slurry, an important feature of the present method is that the fatty alcohol is combined or added at some point in the foam production or generation prior to its introduction into the slurry. The gypsum composition is shaped to form a gypsum core.

The gypsum crystal matrix of the set gypsum core formed with the fatty alcohol and foaming agent regime of the disclosure can be tailored to have any desired pore size distribution. Soap usage differs from product to product depending on the desired void size and distribution, as will be appreciated by one of ordinary skill in the art. Techniques for adjusting void sizes as desired are well known and will be understood by one of ordinary skill in the art. See, e.g., U.S. Pat. No. 5,643,510 and US 2007/0048490. For example, void size distribution of the foamed gypsum core can be finely controlled by adjusting the concentration of the soaps in the aqueous soap mixture. After a foamed gypsum core has, been prepared, inspection of the interior of the gypsum core reveals the void structure. Changes in the void size distribution are produced by varying the soap concentration from the initial or previous concentration. If the interior has too large a fraction of small voids, the soap concentration in the aqueous soap mixture can be reduced if too many very large, oblong or irregularly shaped voids are found, the soap concentration can be increased. Although the optimum void size distribution may vary by product, location or raw materials used, this process technique is useful to move towards the desired void size distribution, regardless of how it is defined. The desirable void size distribution in many embodiments is one that produces a high strength core for the gypsum formulation being used.

For example, in some embodiments, the set gypsum core comprises air voids having an average air void diameter of relatively large air voids, such as an average air void diameter of at least about 100 microns in diameter, an average air void diameter of at least about 150 microns in diameter, an average air void diameter of at least about 200 microns in diameter, an average air void diameter of at least about 250 microns in diameter, an average air void diameter of at least about 300 microns in diameter, or an average air void diameter of at least about 350 microns in diameter, etc.

In some embodiments, the set gypsum core comprises air voids having an average air void diameter of relatively small air voids, such as an average air void diameter of less than about 100 microns in diameter, an average air void diameter of less than about 90 microns in diameter, an average air void diameter of less than about 80 microns in diameter, an air average void diameter of less than about 70 microns in diameter, an average air void diameter of less than about 60 microns in diameter, or an average air void diameter of less than about 50 microns in diameter, etc.

In some embodiments, the gypsum crystal matrix has a pore size distribution comprising voids, wherein the air void size having greatest frequency is a diameter of about 100 microns or less, about 80 microns or less, about 70 microns or less, or about 50 microns or less. In other embodiments, the gypsum crystal matrix has a pore size distribution comprising air voids wherein the air void size having greatest frequency is a diameter of at least about 100 microns, such as a diameter of at least about 150 microns, at least about 200 microns, etc.

In some embodiments, to enhance strength, the set gypsum core includes a significant void volume contributed by large voids, i.e., having a diameter of at least about 100 microns. For example, in some embodiments, at least about 20% of the total void volume of the set gypsum core is contributed by voids having a diameter of at least about 100 microns, such as at least about 30% of the total void volume of the set gypsum core, at least about 40% of the total void volume of the set gypsum core, at least about 50% of the total void volume of the set gypsum core, at least about 60% of the total void volume of the set gypsum core, at least about 70% of the total void volume of the set gypsum core, at least about 80% of the total void volume of the set gypsum core, or at least about 90% of the total void volume of the set gypsum core. To enhance weight reduction while maintaining strength, in some embodiments, smaller generally discrete air voids at high frequency, i.e., having a diameter of less than about 100 microns and/or having a diameter of less than about 50 microns, can be disposed between the large voids. In some embodiments, the air void size having greatest frequency is a diameter of about 100 microns or less, about 80 microns or less, about 70 microns or less, or about 50 microns or less, while at the same time the void volume contribution by air voids having a diameter of at least about 100 microns can be any according to any of the volume percentages stated above. In some embodiments, the distribution of air voids is relatively narrow, which can be characterized by image analysis of micrographs or other images of the core structure.

As used herein, the term average air void size (also referred to as the average air void diameter) is calculated from the largest diameter of individual air voids in the core. The largest diameter is the same as the Feret diameter. The largest diameter of each air void can be obtained from an image of a sample. Images can be taken using any suitable technique, such as scanning electron microscopy (SEM), which provides two-dimensional images. A large number of pore sizes of air voids can be measured in an SEM image, such that the randomness of the cross sections (pores) of the voids can provide the average diameter. Taking measurements of voids in multiple images randomly situated throughout the core of a sample can improve this calculation. Additionally, building a three-dimensional stereological model of the core based on several two-dimensional SEM images can also improve the calculation of the average void size. Another technique is X-ray CT-scanning analysis (XMT), which provides a three-dimensional image. Another technique is optical microscopy, where light contrasting can be used to assist in determining, e.g., the depth of voids. The voids can be measured either manually or by using image analysis software, e.g., ImageJ, developed by NIH. One of ordinary skill in the art will appreciate that manual determination of void sizes and distribution from the images can be determined by visual observation of dimensions of each void. The sample can be obtained by sectioning a gypsum board.

Evaporative water voids, generally having voids of about 5 μm or less in diameter, also contribute voids along with the aforementioned air (foam) voids. In some embodiments, the volume ratio of voids with a pore size greater than about 5 microns to the voids with a pore size of about 5 microns or less, is from about 0.5:1 to about 9:1, such as, for example, from about 0.7:1 to about 9:1, from about 0.8:1 to about 9:1, from about 1.4:1 to about 9:1, from about 1.8:1 to about 9:1, from about 2.3:1 to about 9:1, from about 0.7:1 to about 6:1, from about 1.4:1 to about 6:1, from about 1.8:1 to about 6:1, from about 0.7:1 to about 4:1, from about 1.4:1 to about 4:1, from about 1.8:1 to about 4:1, from about 0.5:1 to about 2.3:1, from about 0.7:1 to about 2.3:1, from about 0.8:1 to about 2.3:1, from about 1.4:1 to about 2.3:1, from about 1.8:1 to about 2.3:1, etc.

While not wishing to be bound by any particular theory, the fatty alcohol is believed to enhance stability of foam bubbles formed from the foaming agent when the foam is introduced into the gypsum slurry (sometimes referred to as a "stucco slurry"). The foam bubbles are further believed to form an outer shell at an interface with the surrounding gypsum slurry. The fatty alcohol is believed to strengthen and stabilize the shell at the interface to thereby provide improved control over void size and distribution. In addition, because of the improved stability, less foam bubbles break up, and thus less foaming agent is needed in some embodiments to achieve the same desired board weight reduction as compared to the same board prepared without the fatty alcohol. It is further believed that the foaming agent forms micelles. In this regard, foaming agents are generally surfactants with a hydrophobic tails and hydrophilic heads. The fatty alcohols can be incorporated into the surfactant micelles such that the hydrophobic regions from the surfactants and from the fatty alcohols are adjacent to each other to protect the foam bubbles by hydrophobic interactions between the hydrophobic regions.

The gypsum slurry includes water and stucco. Any suitable type of stucco can be used in the gypsum slurry, including calcium sulfate alpha hemihydrate, calcium sulfate beta hemihydrate, calcium sulfate anhydrate. The stucco can be fibrous or non-fibrous. Embodiments of the disclosure can accommodate any suitable water-to-stucco ratio (WSR). In some embodiments, the WSR is from about 0.3 to about 1.5, such as, for example, from about 0.3 to about 1.3, from about 0.3 to about 1.2, from about 0.3 to about 1, from about 0.3 to about 0.8, from about 0.5 to about 1.5, from about 0.5 to about 1.3, from about 0.5 to about 1.2, from about 0.5 to about 1, from about 0.5 to about 0.8, from about 0.7 to about 1.5, from about 0.7 to about 1.3, from about 0.7 to about 1.2, from about 0.7 to about 1, from about 0.8 to about 1.5, from about 0.8 to about 1.3, from about 0.8 to about 1.2, from about 0.8 to about 1, from about 0.9 to about 1.5, from about 0.9 to about 1.3, from about 0.9 to about 1.2, from about 1 to about 1.5, from about 1 to about 1.4, from about 1 to about 1.2, etc.

Surprisingly and unexpectedly, the improved stability of foam voids, and related resultant benefits described herein, can be achieved even in the presence of various gypsum slurry additives and amounts used in forming the board core. As such, the improved modified pre-foam mix comprising foaming agent and fatty alcohol in accordance with embodiments of the disclosure can be used in the preparation of various types of gypsum products including ultra lightweight board, mold and water-resistant board, and fire-rated products.

The gypsum slurry can include accelerators or retarders as known in the art to adjust the rate of setting. Accelerator can be in various forms (e.g., wet gypsum accelerator, heat resistant accelerator, and climate stabilized accelerator). See, e.g., U.S. Pat. Nos. 3,573,947 and 6,409,825. In some embodiments where accelerator and/or retarder are included, the accelerator and/or retarder each can be in the stucco slurry for forming the board core in an amount on a solid basis of, such as, from about 0% to about 10% by weight of the stucco (e.g., about 0.1% to about 10%), such as, for example, from about 0% to about 5% by weight of the stucco (e.g., about 0.1 to about 5%).

Other additives can be included in the gypsum slurry to provide desired properties, including green strength, sag resistance, water resistance, mold resistance, fire rating, thermal properties, board strength, etc. Examples of suitable additives include, for example, strength additives such as stare, dispersant, polyphosphate, high expansion particulate, heat sink additive, fibers, siloxane, magnesium oxide, etc., or any combination thereof. The use of the singular term additive herein is used for convenience but will be understood to encompass the plural, i.e., more than one additive in combination, as one of ordinary skill in the art will readily appreciate.

In some embodiments, the gypsum slurry includes a starch that is effective to increase the strength of the gypsum board relative to the strength of the board without the starch (e.g., via increased nail pull resistance). Any suitable strength enhancing starch can be used, including hydroxyalkylated starches such as hydroxyethylated or hydroxypropylated starch, or a combination thereof, or pregelatinized starches, which are generally preferred over acid-modifying migrating starches which generally provide paper-core bond enhancement but not core strength enhancement. Any suitable pregelatinized starch can be included in the enhancing additive, as described in US 2014/0113124 A1 and US 2015/0010767-A1, including methods of preparation thereof and desired viscosity ranges described therein.

If included, the pregelatinized starch can exhibit any suitable viscosity. In some embodiments, the pregelatinized starch is a mid-range viscosity starch as measured according to the VMA method as known in the art and as set forth in US 2014/0113124 A1, which VMA method is hereby incorporated by reference. Desirable pregelatinized starches in accordance with some embodiments can have a mid-range viscosity, e.g., according to the VMA method when measured in a 15 wt. % solution of starch in water, of from about 20 centipoise to about 700 centipoise, e.g., from about from about 20 centipoise to about 600 centipoise, from about 20 centipoise to about 500 centipoise, from about 20 centipoise to about 400 centipoise, from about 20 centipoise to about 300 centipoise, from about 20 centipoise to about 200 centipoise, from about 20 centipoise to about 100 centipoise, from about 30 centipoise to about 700 centipoise, from about 30 centipoise to about 600 centipoise, from about 30 centipoise to about 500 centipoise, from about 30 centipoise to about 400 centipoise, from about 30 centipoise to about 300 centipoise, from about 30 centipoise to about 200 centipoise, from about 30 centipoise to about 100 centipoise, from about 50 centipoise to about 700 centipoise, from about 50 centipoise to about 600 centipoise, from about 50 centipoise to about 500 centipoise, from about 50 centipoise to about 400 centipoise, from about 50 centipoise to about 300 centipoise, from about 50 centipoise to about 200 centipoise, from about 50 centipoise to about 100 centipoise, from about 70 centipoise to about 700 centipoise, from about 70 centipoise to about 600 centipoise, from about 70 centipoise to about 500 centipoise, from about 70 centipoise to about 400 centipoise, from about 70 centipoise to about 300 centipoise, from about 70 centipoise to about 200 centipoise, from about 70 centipoise to about 100 centipoise, from about 100 centipoise to about 700 centipoise, from about 100 centipoise to about 600 centipoise, from about 100 centipoise to about 500 centipoise, from about 100 centipoise to about 400 centipoise, from about 100 centipoise to about 300 centipoise, from about 100 centipoise to about 200 centipoise, etc. In accordance with some embodiments, the pregelatinized starch can be prepared as an extruded starch, e.g., where starch is prepared by pregelatinization and acid-modification in one step in an extruder as described in US 2015/0010767-A1, which extrusion method is hereby incorporated by reference.

If included, the starch can be present in any suitable amount. In some embodiments, the starch is present in the gypsum slurry in an amount of from about 0% to about 20% by weight of the stucco, e.g., from about 0% to about 15% by weight of stucco, from about 0% to about 10% by weight of stucco, from about 0.1% to about 20% by weight of stucco, from about 0.1% to about 15% by weight of stucco, from about 0.1% to about 10% by weight of stucco, from about 0.1% to about 6% by weight of stucco, from about 0.3% to about 4% by weight of stucco, from about 0.5% to about 4% by weight of stucco, from about 0.5% to about 3% by weight of stucco, from about 0.5% to about 2% by weight of stucco, from about 1% to about 4% by weight of stucco, from about 1% to about 3% by weight of stucco, from about 1% to about 2% by weight of stucco, etc.

The gypsum slurry can optionally include at least one dispersant to enhance fluidity in some embodiments. The dispersants may be included in a dry form with other dry ingredients and/or in a liquid form with other liquid ingredients in stucco slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosultbnates or sulfonated lignin. Naphthalenesulfonate dispersants can be used to facilitate formation of larger bubbles and hence larger voids in the final product, and polycarboxylates such as polycarboxylate ethers can be used to firm smaller bubbles and hence smaller voids in the product. As void structure changes to the product are desired during manufacture, such dispersant adjustments and other changes in the process can be made as one of ordinary skill will appreciate. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred. Lower molecular weight naphthalenesulfonate dispersants are favored because they trend to a lower water demand than the higher viscosity, higher molecular weight dispersants. Thus, molecular weights from about 3,000 to about 10,000 (e.g., about 8,000 to about 10,000) are preferred. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from CEO Specialty Chemicals, for example. Another example of naphthalenesulfonate is DAXAD, available from GEO Specialty Chemicals.

If included, the dispersant can be provided in any suitable amount. In some embodiments, for example, the dispersant is present in an amount, for example, from about 0% to about 0.7% by weight of stucco, 0% to about 0.4%, by weight of stucco, about 0.05% to about 5% by weight of the stucco, from about 0.05% to about 0.3% by weight of stucco, or from about 1% to about 5% by weight of stucco.

In some embodiments, the gypsum slurry can optionally include one or more phosphate-containing compounds, if desired. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6–27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}P_nO_{3n+1}$, wherein n=1,000–3,000, or polyphosphoric acid having two or more repeating phosphate units and having the molecular formula $H_{n+2}P_nO_{3n+1}$ wherein n is two or more.

If included, the phosphate-containing compound can be present in any suitable amount. To illustrate, in some embodiments, the phosphate-containing compound can be present in an amount, for example, from about 0.1% to about 1%, e.g., about 0.2% to about 0.4% by weight of the stucco.

A water resistance or mold resistance additive such as siloxane optionally can be included. If included, in some embodiments, the siloxane preferably is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry. As described in U.S. Pat. No. 7,811,685, magnesium oxide can be included to contribute to the catalysis and/or to the mold resistance and/or water resistance in some embodiments. If included, magnesium oxide, is present in any suitable amount, such as from about 0.02% to about 0.1%, e.g., from about 0.02% to about 0.04% by weight of stucco.

In some embodiments, solventless methyl hydrogen siloxane fluid sold under the name SILRES BS 94 by Wacker-Chemie GmbH (Munich, Germany) can be used as the siloxane. This product is a siloxane fluid containing no water or solvents. It is contemplated that from about 0.05% to about 0.5%, e.g., about 0.07% to about 0.14% of the BS 94 siloxane may be used in some embodiments, based on the weight of the stucco. For example, in some embodiments, it is preferred to use from about 0.05% to about 0.2%, e.g., from about 0.09% to about 0.12% of the siloxane based on the dry stucco weight.

The gypsum slurry can include any suitable fire resistant additive in some embodiments. Examples of suitable fire resistant additives include high expansion particulates, high efficiency heat sink additives, fibers, or the like, or any combination thereof, as described in U.S. Pat. No. 8,323,785, which description of such additives is hereby incorporated by reference. Vermiculite, aluminum trihydrate, glass fibers, and a combination thereof can be used in some embodiments.

For example, the high expansion particulates useful in accordance with some embodiments can exhibit a volume expansion after heating for one hour at about 1560° F. (about 850° C.) of about 300% or more of their original volume. In some embodiments, high expansion vermiculites can be used that have a volume expansion of about 300% to about 380% of their original volume after being placed for one hour in a chamber having a temperature of about 1560° F. (about 850° C.). If included, high expansion particulate, such as vermiculite, can be present in any suitable amount. In some embodiments, it is present in an amount from about 1% to about 10%, e.g., about 3% to about 6% by weight of stucco.

Aluminum trihydrate (ATH), also known as alumina trihydrate and hydrated alumina, can increase fire resistance due to its crystallized or compound water content. ATH is a suitable example of a high efficiency heat sink additive. Such high efficiency heat sink (HEHS) additives have a heat sink capacity that exceeds the heat sink capacity of comparable amounts of gypsum dihydrate in the temperature range causing the dehydration and release of water vapor from the gypsum dihydrate component of the panel core. Such additives typically are selected from compositions, such as aluminum trihydrate or other metal hydroxides that decompose, releasing water vapor in the same or similar temperature ranges as does gypsum dihydrate. While other HEHS additives (or combinations of HEHS additives) with increased heat sink efficiency relative to comparable amounts of gypsum dihydrate can be used, preferred HEHS additives provide a sufficiently-increased heat sink efficiency relative to gypsum dihydrate to offset any increase in weight or other undesired properties of the HEHS additives when used in a gypsum panel intended for fire rated or other high temperature applications. If included, heat sink additive, such as ATH, is present in any suitable amount. In some embodiments, it is included in an amount from about 1% to about 8%, e.g., from about 2% to about 4% by weight of stucco.

The fibers may include mineral fibers, carbon and/or glass fibers and mixtures of such fibers, as well as other comparable fibers providing comparable benefits to the panel. In some embodiments, glass fibers are incorporated in the gypsum core slurry and resulting crystalline core structure. The glass fibers in some of such embodiments can have an average length of about 0.5 to about 0.75 inches and a diameter of about 11 to about 17 microns. In other embodiments, such glass fibers may have an average length of about 0.5 to about 0.675 inches and a diameter of about 13 to about 16 microns. If included, fibers, such as glass fibers, is present in any suitable amount, such as, from about 0.1% to about 3%, e.g., from about 0.5% to about 1% by weight of stucco.

The gypsum board according to embodiments of the disclosure has utility in a variety of different products having a range of desired densities, including, but not limited to, drywall (which can encompass such board used not only for walls but also for ceilings and other locations as understood in the art), fire-rated board, mold-resistant board, water-resistant board, etc. Board weight is a function of thickness. Since boards are commonly made at varying thicknesses, board density is used herein as a measure of board weight. Examples of suitable thickness include ⅜ inch, one-half inch, ⅝ inch, ¾ inch, or one inch, or in some countries 9 mm, 9.5 mm, 10 mm, 12 mm, 12.5 mm, 13 mm, 15 mm, 20 mm, or 25 mm. The advantages of the gypsum board in accordance with embodiments of the disclosure can be seen at a range of densities, including up to heavier board densities, e.g., about 43 pcf or less, or 40 pcf or less, such as from about 17 pcf to about 43 pcf, from about 20 pcf to about 43 pcf from about 24 pcf to about 43 pcf, from about 27 pcf to about 43 pcf, from about 20 pcf to about 40 pcf, from about 24 pcf to about 40 pcf, from about 27 pcf to about 40 pcf, from about 20 pcf to about 37 pcf, from about 24 pcf to about 37 pcf, from about 27 pcf to about 37 pcf, from about 20 pcf to about 35 pcf, from about 24 pcf to about 35 pcf, from about 27 pcf to about 35 pcf, etc.

As noted herein, removing mass from gypsum wallboard has led to considerable difficulty in compensating for the concomitant loss in strength. In view of the improved foam void stability, some embodiments of the disclosure surprisingly and unexpectedly enable the use of lower weight board with good strength and/or desired fire or thermal property, lower water demand, and efficient use of additives as described herein. For example, in some embodiments, board density can be from about 17 pcf to about 35 pcf, e.g., from about 17 pcf to about 33 pcf, 17 pcf to about 31 pcf, 17 pcf to about 28 pcf, from about 20 pcf to about 32 pcf, from about 20 pcf to about 31 pcf, from about 20 pcf to about 30 pcf, from about 20 pcf to about 30 pcf, from about 20 pcf about 29 pcf, from about 20 pcf to about 28 pcf, from about 21 pcf to about 33 pcf, from about 21 pcf to about 32 pcf, from about 21 pcf to about 33 pcf, from about 21 pcf to about 32 pcf, from about 21 pcf to about 31 pcf from about 21 pcf to about 30 pcf, from about 21 pcf to about 29 pcf, from about 21 pcf to about 28 pcf, from about 21 pcf to about 29 pcf, from about 24 pcf to about 33 pcf, from about 24 pcf to about 32 pcf, from about 24 pcf to about 31 pcf, from about 24 pcf to about 30 pcf, from about 24 pcf to about 29 pcf, from about 24 pcf to about 28 pcf, or from about 24 pcf to about 27 pcf, etc.

The cover sheets can be in any suitable form. It will be understood that, with respect to cover sheets, the terms "face" and "top" sheets are used interchangeably herein, while the terms "back" and "bottom" are likewise used interchangeably herein. For example, the cover sheets may comprise cellulosic fibers, glass fibers, ceramic fibers, mineral wool, or a combination of the aforementioned materials. One or both of the sheets may comprise individual sheets or multiple sheets. In preferred embodiments, the cover sheets comprise a cellulosic fiber. For example, paper sheet, such as Manila paper or kraft paper, can be used as the back sheet. Useful cover sheet paper includes Manila 3-ply, Manila 7-ply, News-Line 3-ply, or News-Line 7-ply available from United States Gypsum Corporation, Chicago, Ill.; and Manila heavy paper and MH Manila HT (high tensile) paper, available from United States Gypsum Corporation, Chicago, Ill.

In addition, the cellulosic paper can comprise any other material or combination of materials. For example, one or both sheets, particularly the face (top) sheet can include polyvinyl alcohol, boric acid, or polyphosphate as described herein (e.g., sodium trimetaphosphate) to enhance the strength of the paper. In some embodiments, the paper can be contacted with a solution of one or more of polyvinyl alcohol, bode acid, and/or polyphosphate so that the paper is at least partially wetted. The paper can be at least partially saturated in some embodiments. The polyvinyl alcohol, boric acid and/or boric acid can penetrate the fibers in the paper in some embodiments. The solution of polyvinyl alcohol, boric acid, and/or polyphosphate can be in any suitable amount and can be applied in any suitable manner as will be appreciated in the art. For example, the solution can be in the form of from about 1% to about 5% solids by weight in water of each ingredient present between the polyvinyl alcohol, the boric acid and/or polyphosphate, which can be added in one solution or if desired in multiple solutions.

In some embodiments, one or both sheets can comprise glass fibers, ceramic fibers, mineral wool, or a combination of the aforementioned materials. One or both sheets in accordance with the present disclosure can be generally hydrophilic, meaning that the sheet is at least partially capable of adsorbing water molecules onto the surface of the sheet and/or absorbing water molecules into the sheet.

In other embodiments, the cover sheets can be "substantially free" of glass fibers ceramic fibers, mineral wool, or a mixture thereof, which means that the cover sheets contain either (i) 0 wt. % based on the weight of the sheet, or no such glass fibers ceramic fibers, mineral wool, or a mixture thereof, or (ii) an ineffective or (iii) an immaterial amount of glass fibers ceramic fibers, mineral wool, or a mixture thereof. An example of an ineffective amount is an amount below the threshold amount to achieve the intended purpose of using glass fibers ceramic fibers, mineral wool, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. % based on the weight stucco as one of ordinary skill in the art will appreciate. However, if desired in alternative embodiments, such ingredients can be included in the cover sheets.

In some embodiments, the thermal conductivity of the top and/or bottom sheet is less than about 0.1 w/(m.k.). For example, the thermal conductivity of the top and/or bottom sheet is less than about 0.05 w/(m.k.).

If desired, in some embodiments, one or both cover sheets can optionally include any suitable amount of inorganic compound or mixture of inorganic compounds that adequately imparts greater fire endurance where such properties are sought. Examples of suitable inorganic compounds include aluminum trihydrate and magnesium hydroxide. For example, the cover sheets can comprise any inorganic compound or mixture of inorganic compounds with high crystallized water content, or any compound that releases water upon heating. In some embodiments, the amount of inorganic compound or the total mixture of inorganic compounds in the sheet ranges from about 0.1% to about 30% by weight of the sheet. The inorganic compound or inorganic compounds used in the sheet may be of any suitable particle size or suitable particle size distribution.

In some embodiments, ATH can be added in an amount from about 5% to about 30% by total weight of the sheet. ATH typically is very stable at room temperature. Above temperatures between about 180° C. and 205° C., ATH typically undergoes an endothermic decomposition releasing water vapor. The heat of decomposition for such ATH additives is greater than about 1000 Joule/gram, and in one embodiment is about 1170 Joule/gram. Without being bound by theory, it is believed that the ATH additive decomposes to release approximately 35% of the water of crystallization as water vapor when heated above 205° C. in accordance with the following equation: $Al(OH)_3 \rightarrow Al_2O_3 + 3H_2O$.

A cover sheet comprising inorganic particles of high water content, such as ATH, can increase fire endurance of the board. The inorganic compound or mixture of compounds is incorporated into the sheet in some embodiments. A cover sheet such as paper comprising ATH can be prepared by first diluting cellulosic fiber in water at about 1% consistency, then mixing with ATH particles at a predetermined ratio. The mixture can be poured into a mold, the bottom of which can have a wire mesh to drain off water. After draining, fiber and ATH particles are retained on the wire. The wet sheet can be transferred to a blotter paper and dried at about 200-360° F.

In some embodiments, as described for inclusion in the cover sheet or in a stucco slurry, e.g., ATH particles of less than about 20 μm are preferred, but any suitable source or grade of ATH can be used. For example, ATH can be obtained from commercial suppliers such as Huber under the brand names SB 432 (10 μm) or Hydra® 710 (1 μm).

In some embodiments, the cover sheet may comprise magnesium hydroxide. In these embodiments, the magnesium hydroxide additive preferably has a heat of decomposition greater than about 1000 Joule/gram, such as about 1350 Joule/gram, at or above 180° C. to 205° C. In such embodiments, any suitable magnesium hydroxide can be used, such as that commercially available from suppliers, including Akrochem Corp. of Akron, Ohio.

In other embodiments, the cover sheets be "substantially free" of inorganic compounds such as ATH, magnesium hydroxide, or a mixture thereof, which means that the cover sheets contain either (i) 0 wt. % based on the weight of the sheet, or no such inorganic compounds such as ATH, magnesium hydroxide, or a mixture thereof, or (ii) an ineffective or (iii) an immaterial amount of inorganic compounds such as ATH, magnesium hydroxide, or a mixture thereof. An example of an ineffective amount is an amount below the threshold amount to achieve the intended purpose of using inorganic compounds such as ATH, magnesium hydroxide, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.1 wt. %, below about 0.05 wt. %, below about 0.01 wt. %, etc.

The cover sheets can also have any suitable total thickness. In some embodiments, at least one of the cover sheets has a relatively high thickness, e.g., a thickness of at least about 0.014 inches. In some embodiments, it is preferred that there is an even higher thickness, e.g., at east about 0.015 inches, at least about 0.016 inches, at least about 0.017 inches, at least about 0.018 inches, at least about 0.019 inches, at least about 0.020 inches, at least about 0.021 inches, at least about 0.022 inches, or at least about 0.023 inches. Any suitable upper limit for these ranges can be adopted, e.g., an upper end of the range of about 0.030 inches, about 0.027 inches, about 0.025 inches, about 0.024 inches, about 0.023 inches, about 0.022 inches, about 0.021 inches, about 0.020 inches, about 0.019 inches, about 0.018 inches, etc. The total sheet thickness refers to the sum of the thickness of each sheet attached to the gypsum board.

The cover sheets can have any suitable density. For example, in some embodiments, at least one or both of the cover sheets has a density of at least about 36 pcf, e.g., from about 36 pcf to about 46 pcf, such as from about 36 pcf to about 44 pcf, from about 36 pcf to about 42 pcf, from about 36 pcf about 40 pcf, from about 38 pcf to about 46 pcf, from about 38 pcf to about 44 pcf, from about 38 pcf to about 42 pcf, etc.

The cover sheet can have any suitable weight. For example, in some embodiments, lower basis weight cover sheets (e.g., formed from paper) such as, for example, at least about 33 lbs/MSF (e.g., from about 33 lbs/MSF to about 65 lbs/MSF, from about 33 lbs/MSF to about 60 lbs/MSF, 33 lbs/MSF to about 58 lbs/MSF from about 33 lbs/MSF to about 55 lbs/MSF, from about 33 lbs/MSF to about 50 lbs/MSF, from about 33 lbs/MSF to about 45 lbs/MSF, etc, or less than about 45 lbs/MSF)) can be utilized in some embodiments. In other embodiments, one or both cover sheets has a basis weight from about 38 lbs/MSF to about 65 lbs/MSF, from about 38 lbs/MSF to about 60 lbs/MSF, from about 38 lbs/MSF to about 58 lbs/MSF, from about 38 lbs/MSF to about 55 lbs/MSF, from about 38 lbs/MSF to about 50 lbs/MSF, from about 38 lbs/MSF to about 45 lbs/MSF.

However, if desired, in some embodiments, even heavier basis weights can be used, e.g., to further enhance nail pull resistance or to enhance handling, e.g., to facilitate desirable "feel" characteristics for end-users. Thus, one or both of the cover sheets can have a basis weight of, for example, at least about 45 lbs/MSF (e.g., from about 45 lbs/MSF to about 65 lbs/MSF, from about 45 lbs/MSF to about 60 lbs/MSF, from about 45 lbs/MSF to about 55 lbs/MSF, from about 50 lbs/MST to about 65 lbs/MSF, from about 50 lbs/MSF to about 60 lbs/MSF, etc.). If desired, in some embodiments, one cover sheet (e.g., the "face" paper side when installed) can have the aforementioned higher basis weight, e.g., to enhance nail pull resistance and handling, while the other cover sheet (e.g., the "back" sheet when the board is installed) can have somewhat lower weight basis if desired (e.g., weight basis of less than about 60 lbs/MSF, e.g., from about 33 lbs/MSF to about 55 lbs/MSF, from about 33 lbs/MSF to about 50 lbs/MSF, from about 33 lbs/MSF to about 45 lbs/MSF, or from about 33 lbs/MSF to about 40 lbs/MSF).

In some embodiments, the gypsum board product exhibits fire resistance beyond what is found in conventional wallboard. To achieve fire resistance, the board can optionally be formed from certain additives that enhance fire resistance in the final board product, as described herein. Some fire resistant board is considered "fire rated" when the board passes certain tests while in an assembly.

In some embodiments, the gypsum board containing fire-resistant additive can pass certain tests using a small scale bench test, in accordance with ASTM C1795-15, including high temperature shrinkage in the x-y directions (width-length), high temperature shrinkage (or even expansion) in the z-direction (thickness), and a Thermal Insulation Index (TI). Such bench tests are suitable for predicting the fire resistance performance of the gypsum board, e.g., in full scale tests under ASTM E119-09a for assemblies constructed under any of UL U305, U419, and/or U423 (2015 editions), and/or equivalent fire test procedures and standards. Passing the ASTM E119-09a test with the assembly of any one of these UL tests allows for a fire-rating. Briefly, UL U305 calls for wood studs in the assembly. UL U419 is a non-load bearing metal stud assembly, using 25 gauge studs. UL U423 is a load bearing metal stud assembly using 20 gauge studs. UL U419 is generally considered a more difficult test to pass than UL U305 or UL U423 because it uses light gauge steel studs that deform more easily than the studs used under UL U305 and UL U423.

In accordance with some embodiments, gypsum board is configured to meet or exceed a fire rating pursuant to the fire containment and structural integrity requirements of assemblies constructed under one or more of UL U305, U419, and/or U423, using ASTM E119, and/or equivalent fire test procedures and standards, e.g., where the board contains fire resistant additives discussed herein. The present disclosure thus provides gypsum board (e.g., reduced weight and density at thickness of ½ inch or ⅝ inch), and methods for making the same, that are capable of satisfying fire ratings (e.g., 17 min., 20 min., 30 min., ¾ hour, one-hour, two-hour, etc.) pursuant to the fire containment and structural integrity procedures and standards of various UL standards such as those discussed herein, in some embodiments.

The gypsum board can be tested, e.g., in an assembly according to Underwriters Laboratories UL 0305, U419, and U423 specifications and any other fire test procedure that is equivalent to any one of those fire test procedures. It should be understood that reference made herein to a particular fire test procedure of ASTM E-119 and using assemblies prepared in accordance with Underwriters Laboratories, such as, UL U305, U419, and U423, for example, also includes a fire test procedure, such as one promulgated by any other entity, that is equivalent to ASTM E119-09a and the particular UL standard in question.

For example, the gypsum board in some embodiments is effective to inhibit the transmission of heat through an assembly constructed in accordance with any one of UL Design Numbers U305, U419 or U423, the assembly having a first side with a single layer of gypsum boards and a second side with a single layer of gypsum boards. ASTM E119-09a involves placing thermocouples in numerous places throughout a particular assembly. The thermocouples then monitor temperature as the assembly is exposed to heat over time, in this respect, surfaces of gypsum boards on the first side of the assembly are heated in accordance with the time-temperature curve of ASTM E119-09a, while surfaces of gypsum panels on the second side of the assembly are provided with temperature sensors pursuant to ASTM E119-09a. ASTM E119 specifies that the assembly fails the test if any of the thermocouples exceeds a certain preset temperature (ambient plus 325° F.), or if the average of the temperatures from the thermocouples exceeds a different preset temperature (ambient plus 250° F.).

In some embodiments of fire resistant board, when heated, the maximum single value of the temperature sensors is less than about 325° F. plus ambient temperature after about 50 minutes, and/or or the average value of the temperature sensors is less than about 250° F. plus ambient temperature after about 50 minutes. In some embodiments, the board has a density of about 40 pounds per cubic foot or less. Desirably, the board has good strength as described herein, such as a core hardness of at least about 11 pounds (5 kg), e.g., at least about 13 pounds (5.9 kg), or at least about 15 pounds (6.8 kg).

In some embodiments, when the surfaces on the first side of the assembly of fire resistant gypsum board with fire resistant additive are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum board on the first side of the assembly are heated the maximum single value of the temperature sensors is less than about 325° F. plus ambient temperature after about 60 minutes and/or the average value of the temperature sensors is less than about 250° F. plus ambient temperature after about 60 minutes. In other embodiments, when the surfaces of gypsum panels on the first side of the assembly are heated, the maximum single value of the temperature sensors is less than about 325° F. plus ambient temperature after about 50 minutes, and/or the average value of the temperature sensors is less than about 250° F. plus ambient temperature after about 50 minutes. In other embodiments, when the surfaces of gypsum boards on the first side of the assembly are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum boards on the first side of the assembly are heated, the maximum single value of the temperature sensors is less than about 325° F. plus ambient temperature after about 60 minutes, and the average value of the temperature sensors is less than about 250° F. plus ambient temperature after about 60 minutes.

In some embodiments, fire resistant gypsum board with fire resistant additive is effective to inhibit the transmission of heat through the assembly when constructed in accordance with UL Design Number U305 so as to achieve a one hour fire rating under ASTM E119-09a. In some embodiments, the board is effective to inhibit the transmission of heat through the assembly when constructed in accordance with UL Design Number 15419 so as to achieve a one hour fire rating under ASTM E119-09a. In some embodiments, the gypsum board is effective to inhibit the transmission of heat through the assembly when constructed in accordance with U L Design Number U423 so as to achieve a one hour fire rating under ASTM E119-09a, in some embodiments, the board has a Thermal insulation Index (TI) of about 20 minutes or greater and/or a High Temperature Shrinkage (S) of about 10% or less, in accordance with ASTM C1795-15. In some embodiments, the board has a ratio of High Temperature Thickness Expansion (JE) to S (TE/S) of about 0.06 or more, e.g., about 0.2 or more.

Furthermore, in some embodiments, the gypsum board can be in the form of reduced weight and density, fire resistant gypsum board with High Temperature Shrinkage of less than about 10% in the x-y directions (width-length) and High Temperature. Thickness Expansion in the z-direction (thickness) of greater than about 20% when heated to about 1560° F. (850° C.). In yet other embodiments, when used in wall or other assemblies, such assemblies have fire testing performance comparable to assemblies made with heavier, denser commercial fire rated panels. In some embodiments, the High Temperature Shrinkage of the panels typically is less than about 10% in the x-y directions (width-length). In some embodiments, the ratio of z-direction High Temperature Thickness Expansion to x-y High Temperature Shrinkage is at least about 2 to over about 17 at 1570° F. (855° C.).

In some embodiments, a fire resistant gypsum board formed according to principles of the present disclosure, and the methods for making same, can provide a panel that exhibits an average shrink resistance of about 85% or greater when heated at about 1800 (980° C.) for one hour. In other embodiments, the gypsum board exhibits an average shrink resistance of about 75% or greater when heated at about 1800° F. (980° C.) for one hour.

The gypsum layers between the cover sheets can be effective to provide a Thermal Insulation Index (TI) of about 20 minutes or greater. The board can have a desired density (I)) as described herein. The gypsum layers between the cover sheets can be effective to provide the gypsum board with a ratio of TI/D of about 0.6 minutes/pounds per cubic foot (0.038 minutes/(kg/m³)) or more.

In some embodiments, gypsum board made according to the disclosure meets test protocols according to ASTM Standard C473-10. For example, in some embodiments, when the board is cast at a thickness of ½ inch, the board has a nail pull resistance of at least about 65 $lb_f$ (pounds force, which is sometimes referred to as simply "lb" or "lbs" for convenience by those of ordinary skill in the art, who understand this is a measurement of force) as determined according to ASTM C473-10 (method B), e.g., at least about 68 $lb_f$, at least about 70 $lb_f$, at least about 72 $lb_f$, at least about 74 $lb_f$, at least about 75 $lb_f$, at least about 76 $lb_f$, at least about 77 $lb_f$, etc. In various embodiments, the nail pull resistance can be from about 65 $lb_f$ to about 100 $lb_f$, from about 65 $lb_f$ to about 95 $lb_f$, from about 65 $lb_f$ to about 90 $lb_f$, from about 65 $lb_f$ to about 85 $lb_f$, from about 65 $lb_f$ to about 80 $lb_f$, from about 65 $lb_f$ to about 75 $lb_f$, from about 68 $lb_f$ to about 100 $lb_f$, from about 68 $lb_f$ to about 95 $lb_f$, from about 68 $lb_f$ to about 90 $lb_f$, from about 68 $lb_f$ to about 85 $lb_f$, from about 68 $lb_f$ to about 80 $lb_f$, from about 70 $lb_f$ to about 100 $lb_f$, from about 70 $lb_f$ to about 95 $lb_f$, from about 70 $lb_f$ to about 90 $lb_f$, from about 70 $lb_f$ to about 85 $lb_f$, from about 70 $lb_f$ to about 80 $lb_f$, from about 72 $lb_f$ to about 100 $lb_f$, from about 72 $lb_f$ to about 95 $lb_f$, from about 72 $lb_f$ to about 90 $lb_f$, from about 72 $lb_f$ to about 85 $lb_f$, from about 72 $lb_f$ to about 80 $lb_f$, from about 72 $lb_f$ to about 77 $lb_f$, from about 72 $lb_f$ to about 75 $lb_f$, from about 75 $lb_f$ to about 100 $lb_f$, from about 75 $lb_f$ to about 95 $lb_f$, from about 75 $lb_f$ to about 90 $lb_f$, from about 75 $lb_f$ to about 85 $lb_f$, from about 75 $lb_f$ to about 80 $lb_f$, from about 75 $lb_f$ to about 77 $lb_f$, from about 77 $lb_f$ to about 100 $lb_f$, from about 77 $lb_f$ to about 95 $lb_f$, from about 77 $lb_f$ to about 90 $lb_f$, from about 77 $lb_f$ to about 85 $lb_f$, or from about 77 $lb_f$ to about 80 $lb_f$.

With respect to flexural strength, in some embodiments, when cast in a board of one-half inch thickness, the board has a flexural strength of at least about 36 $lb_f$ in a machine direction (e.g., at least about 38 $lb_f$, at least about 40 $lb_f$, etc) and/or at least about 107 $lb_f$ (e.g., at least about 110 $lb_f$, at least about 112 $lb_f$, etc.) in a cross-machine direction as determined according to the ASTM standard C473-10, method B. In various embodiments, the board can have a flexural strength in a machine direction of from about 36 $lb_f$ to about 60 $lb_f$, e.g., from about 36 $lb_f$ to about 55 $lb_f$, from about 36 $lb_f$ to about 50 $lb_f$, from about 36 $lb_f$ to about 45 $lb_f$, from about 36 $lb_f$ to about 40 $lb_f$, from about 36 $lb_f$ to about 38 $lb_f$, from about 38 $lb_f$ to about 60 $lb_f$, from about 38 $lb_f$ to about 55 $lb_f$, from about 38 $lb_f$ to about 50 $lb_f$, from about 38 $lb_f$ to about 45 $lb_f$, from about 38 $lb_f$ to about 40 $lb_f$, from about 40 $lb_f$ to about 60 $lb_f$, from about 40 $lb_f$ to about 55 $lb_f$, from about 40 $lb_f$ to about 50 $lb_f$, or from about 40 $lb_f$ to about 45 $lb_f$. In various embodiments, the board can have a flexural strength in a cross-machine direction of from about 107 $lb_f$ to about 130 $lb_f$, e.g., from about 107 $lb_f$ to about 125 $lb_f$, from about 107 $lb_f$ to about 120 $lb_f$, from about 107 $lb_f$ to about 115 $lb_f$, from about 107 $lb_f$ to about 112 $lb_f$, from about 107 $lb_f$ to about 110 $lb_f$, from about 110 $lb_f$ to about 130 $lb_f$, from about 110 $lb_f$ to about 125 $lb_f$, from about 110 $lb_f$ to about 120 $lb_f$, from about 110 $lb_f$ to about 115 $lb_f$, from about 110 $lb_f$ to about 112 $lb_f$, from about 112 $lb_f$ to about 130 $lb_f$, from about 112 $lb_f$ to about 125 $lb_f$, from about 112 $lb_f$ to about 120 $lb_f$, or from about 112 $lb_f$ to about 115 $lb_f$.

In addition, in some embodiments, board can have an average core hardness of at least about 11 $lb_f$, e.g., at least about 12 $lb_f$, at least about 13 $lb_f$, at least about 14 $lb_f$, at least about 15 $lb_f$, at least about 16 $lb_f$, at least about 17 $lb_f$, at least about 18 $lb_f$, at least about 19 $lb_f$, at least about 20 $lb_f$, at least about 21 $lb_f$, or at least about 22 $lb_f$ as determined according to ASTM C473-10, method B. In some embodiments, board can have a core hardness of from about 11 $lb_f$ to about 25 $lb_f$, e.g., from about 11 $lb_f$ to about 22 $lb_f$, from about 11 $lb_f$ to about 21 $lb_f$, from about 11 $lb_f$ to about 2.0 $lb_f$, from about 11 $lb_f$ to about 19 $lb_f$, from about 11 $lb_f$ to about 18 $lb_f$, from about 11 $lb_f$ to about 17 $lb_f$, from about 11 $lb_f$ to about 16 $lb_f$, from about 11 $lb_f$ to about 15 $lb_f$, from about 11 $lb_f$ to about 14 $lb_f$, from about 11 $lb_f$ to about 13 $lb_f$, from about 11 $lb_f$ to about 12 $lb_f$, from about 12 $lb_f$ to about 25 $lb_f$, from about 12 $lb_f$ to about 22 $lb_1$, from about 12 $lb_f$ to about 21 $lb_f$, from about 12 $lb_f$ to about 20 $lb_f$, from about 12 $lb_f$ to about 19 $lb_f$, from about 12 $lb_f$ to about 18 $lb_f$, from about 12 $lb_f$ to about 17 $lb_f$, from about 12 $lb_f$ to about 16 $lb_f$, from about 12 $lb_f$ to about 15 $lb_f$, from about 12 $lb_f$ to about 14 $lb_f$, from about 12 $lb_f$ to about 13 $lb_f$, from about 13 $lb_f$ to about 25 $lb_f$, from about 13 $lb_f$ to about 22 $lb_f$, from about 13 $lb_f$ to about 21 $lb_f$, from about 13 $lb_f$ to about 20 $lb_f$, from about 13 $lb_f$ to about 19 $lb_f$, from about 13 $lb_f$ to about 18 $lb_f$, from about 13 $lb_f$ to about 17 $lb_f$, from about 13 $lb_f$ to about 16 $lb_f$, from about 13 $lb_f$ to about 15 $lb_f$, from about 13 $lb_f$ to about 14 $lb_f$, from about 14 $lb_f$ to about 25 $lb_f$, from about 14 $lb_f$ to about 22 $lb_f$, from about 14 $lb_f$ to about 21 $lb_f$, from about 14 $lb_f$ to about 20 $lb_f$, from about 14 $lb_f$ to about 19 $lb_f$, from about 14 $lb_f$ to about 18 $lb_f$, from about 14 $lb_f$ to about 17 $lb_f$, from about 14 $lb_f$ to about 16 $lb_f$, from about 14 $lb_f$ to about 15 $lb_f$, from about 15 $lb_f$ to about 25 $lb_f$, from about 15 $lb_f$ to about 22 $lb_f$, from about 15 $lb_f$ to about 21 $lb_f$, from about 15 $lb_f$ to about 20 $lb_f$, from about 15 $lb_f$ to about 19 $lb_f$, from about 15 $lb_f$ to about 18 $lb_f$, from about 15 $lb_f$ to about 17 $lb_f$, from about 15 $lb_f$ to about 16 $lb_f$, from about 16 $lb_f$ to about 25 $lb_f$, from about 16 $lb_f$ to about 22 $lb_f$, from about 16 $lb_f$ to about 21 $lb_f$, from about 16 $lb_f$ to about 20 $lb_f$, from about 16 $lb_f$ to about 19 $lb_f$, from about 16 $lb_f$ to about 18 $lb_f$, from about 16 $lb_f$ to about 17 $lb_f$, from about 17 $lb_f$ to about 25 $lb_1$, from about 17 $lb_f$ to about 22 $lb_f$, from about 17 $lb_f$ to about 21 $lb_f$, from about 17 $lb_f$ to about 20 $lb_f$, from about 17 $lb_f$ to about 19 $lb_f$, from about 17 $lb_f$ to about 18 $lb_f$, from about 18 $lb_f$ to about 25 $lb_f$, from about 18 $lb_f$ to about 22 $lb_f$, from about 18 $lb_f$ to about 21 $lb_f$, from about 18 $lb_f$ to about 20 $lb_f$, from about 18 $lb_f$ to about 19 $lb_f$, from about 19 $lb_f$ to about 25 $lb_f$, from about 19 $lb_f$ to about 22 $lb_f$, from about 19 $lb_f$ to about 21 $lb_f$, from about 19 $lb_f$ to about 20 $lb_f$, from about 21 $lb_f$ to about 25 $lb_f$, from about 21 $lb_f$ to about 22 $lb_f$, or from about 22 $lb_f$ to about 25 $lb_f$.

Product according to embodiments of the disclosure can be made on typical manufacturing lines. For example, board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the gypsum slurry are fed to a mixer (e.g., a pin or pinless mixer), where they are agitated to form the gypsum slurry. The mixer comprises a main body and a discharge conduit (e.g., a gate-canister-boot arrangement as known in the art, or an arrangement as described in U.S. Pat. Nos. 6,494,609 and 6,874,930). In some embodiments, the discharge conduit can include a slurry distributor with either a single feed inlet or multiple feed inlets, such as those described in U.S. Patent Application Publication 2012/0168527 A1 and U.S. Patent Application Publication 2012/0170403 A1, for example. In those embodiments, using a slurry distributor with multiple feed inlets, the discharge conduit can include a suitable flow splitter, such as those described in U.S. Patent Application Publication 2012/0170403 A1. Foaming agent can be added in the discharge conduit of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary gypsum slurry and will form the board core. This board core slurry is discharged onto the moving face cover sheet.

The face cover sheet may bear a thin skim coat in the form of a relatively dense layer of slurry. Also, hard edges, as known in the art, can be formed, e.g., from the same slurry stream forming the face skim coat. In embodiments where foam is inserted into the discharge conduit, a stream of secondary gypsum slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a board precursor to the final product. The second cover sheet may optionally bear a second skim coat, which can be formed from the same or different secondary (dense) gypsum slurry as for the face skim coat, if present. The cover sheets may be formed from paper, fibrous mat or other type of material (e.g., foil plastic, glass mat, non-woven material such as blend of cellulosic and inorganic filler, etc.).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln). Surprisingly and unexpectedly, it has been found that board prepared according to embodiments of the disclosure with pregelatinized, partially hydrolyzed starch prepared in accordance with embodiments of the disclosure requires significantly less time in a drying process because of the low water demand characteristic of the starch. This is advantageous because it reduces energy costs.

In some embodiments, the fatty alcohol of the invention can be used to stabilize the foaming agent of the board core in a composite board having a concentrated layer as described in U.S. Applications 62/184,060, 62/290,361, and Ser. No. 15/186,176, incorporated herein by reference. For example, the fatty alcohol and foaming agent can be used to prepare the low density board core, with additives more concentrated in the concentrated layer, using the ingredients, amounts, board dimensions, and methods of productions described in U.S. Application 62/184,060, 62/290,361, and Ser. No. 15/186,176.

In some embodiments, the fatty alcohol can be used in cement board products. The cement can be formed from a core mix of water and a cement material (e.g., Portland cement, alumina cement, magnesia cement, etc., and blends of such materials). A foaming agent and the fatty alcohol are also included in the mix. Optionally, light-weight aggregate (e.g., expanded clay, expanded slag, expanded shale, perlite, expanded glass beads, polystyrene beads, and the like) can be included in the mix in some embodiments. Other additives that can be used in forming the cement board include, for example, dispersant, fiber (e.g., glass, cellulosic, PVC, etc.), accelerator, retarder, pozzolanic material, calcium sulfate hemihydrate (e.g., calcium sulfate alpha hemihydrate), filler, etc., or combinations thereof.

The fatty alcohol can be used in a method of forming foamed cement slurry. The method comprises, consists of, or consists essentially of combining foaming agent with fatty alcohol to form an aqueous soap mixture; generating a foam from the aqueous soap mixture; and adding the foam to a cement slurry comprising cement (e.g., Portland cement, alumina cement, magnesia cement, etc., or combinations thereof) and water to form the foamed cement slurry. As the foam is entrained in the cement slurry, foam bubbles are formed with a shell surrounding the bubbles interfacing the slurry. Without wishing to be bound by any particular theory, the presence of fatty alcohol is believed to desirably stabilize the shell at the interface. Other additives can also be added to the cement slurry, such as, for example, dispersant, fiber (e.g., glass, cellulosic, PVC, etc.), accelerator, retarder, pozzolanic material, calcium sulfate hemihydrate (e.g., calcium sulfate alpha hemihydrate), filler, etc., or combinations thereof. Methods of preparing cement boards (and additives included therein) are described in, for example, U.S. Pat. Nos. 4,203,788; 4,488,909; 4,504,335; 4,916,004; 6,869,474; and 8,070,878.

The cement slurry comprising, consisting, or consisting essentially of water, cement, foaming agent, and a fatty alcohol can have increased strength compared to the same board formed without the fatty alcohol, when the slurry is formed and dried as board.

The following example(s) further illustrate the invention but, of course, should not be construed as in any way limiting its scope.

Example 1

This example demonstrates the effect of fatty alcohols on the foaming properties of foaming agents, with and without the presence of polycarboxylate dispersant.

In particular, banning, surface tension, and stability experiments were carried out on lip arcing agent solutions. Three types of foaming agents (soaps) were tested. Foaming Agent 1A was a stable soap, in the form of CS230, which is a lauryl ether sulfate blend, commercially available from Stepan (Northfield, Ill.), in addition, two unstable soaps were tested, identified as Foaming Agent 1B and Foaming Agent 1C. Foaming Agent 1B was Polystep B25, which is an alkyl sulfate blend, commercially available from Stepan, and Foaming Agent 1C was Hyonic 25AS, which is an alkyl sulfate blend, commercially available from Ceo Specialty Chemicals (Ambler, Pa.). Each foaming agent acts as a surfactant and hence formed tried a surfactant solution since they require water.

Surfactant solution modifications were conducted by adding a fatty alcohol in some samples as indicated in FIGS. 2-5 and Table 1. The fatty alcohols that were tested were 1-octanol, 1-decanol, and 1-dodecanol. Each solution contained 30 wt. % surfactant and 1 wt. % fatty alcohol (where present). Some solutions were further modified by addition of 0.1 wt. % (1000 ppm) of polycarboxylate ether (PCE) dispersant in the form of Ethacryl commercially available from Coatex Group, Genay, France. The PCE was included to evaluate the impact of soap modifiers on systems with a surface active polymeric dispersant used in gypsum products. The balance of each solution was water. Foaming studies were conducted by shaking (by hand) 10 ml of surfactant solution in a vial for 60 seconds and reporting the (barn height in mm.

Figure 2:
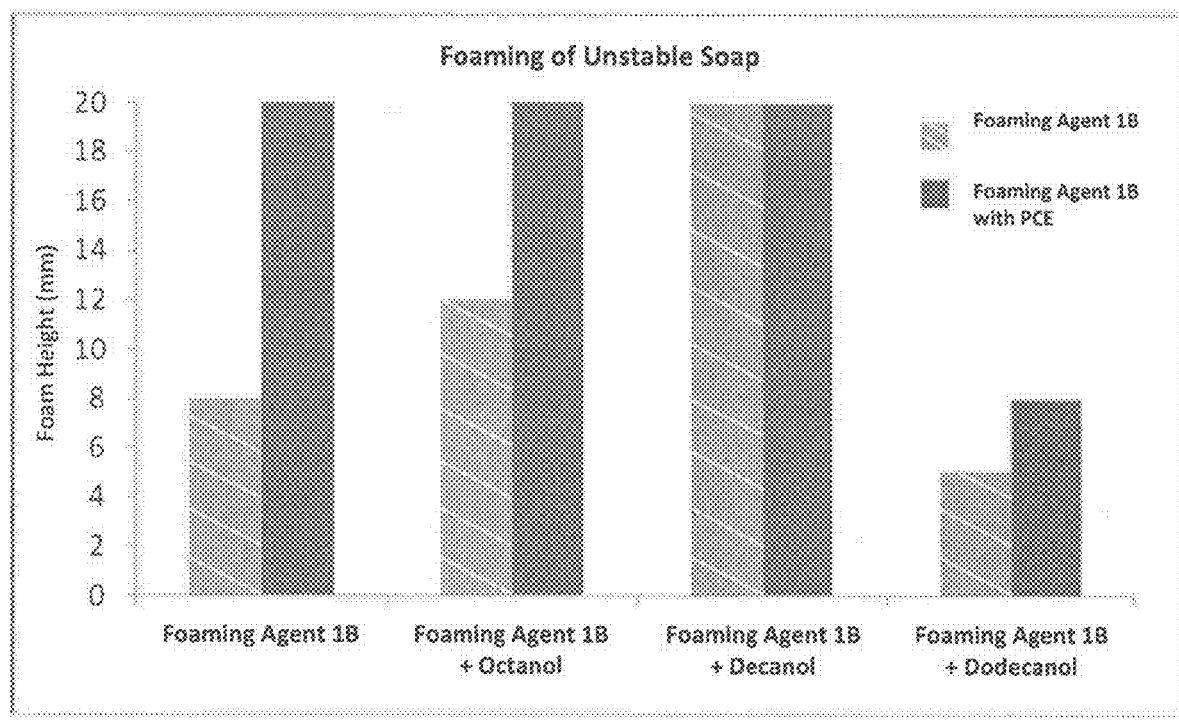
FIG. 2 is a bar graph of foam height (mm) (Y-axis) versus foaming agent solutions containing Foaming Agent 1B (X-axis), as described in Example 1 herein.
Figure 3:
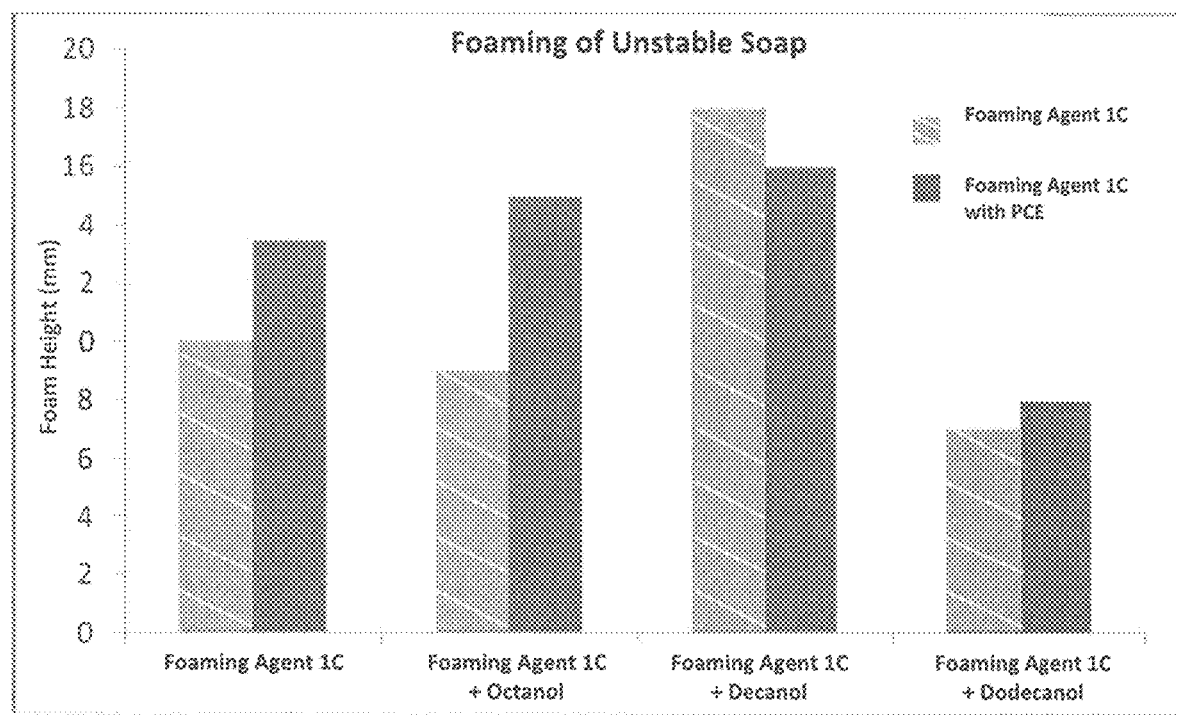
FIG. 3 is a bar graph of foam height (mm) (Y-axis) versus foaming agent solutions containing Foaming Agent 1C (X-axis), as described in Example 1 herein.

FIGS. 1-3 are bar graphs that illustrate the foaming results. FIG. 1 shows the results of foam generated with stable soap and unstable soaps both alone and in the presence of 1000 ppm of polycarboxylate ether dispersant in the form of Ethacryl M™ (Coatex). FIG. 1 shows that poly carboxylates have a strong influence on foaming of both unstable soaps.

FIGS. 2 and 3 illustrate foam generated with 1 wt. % fatty alcohol modified unstable surfactant solutions (Foaming Agents 1B and 1C, respectively), alone, or with 1000 ppm of polycarboxylate ether dispersant in the form of Ethacryl M™ (Coatex). FIGS. 2-3 demonstrate that soap modification with 1 wt. % of fatty alcohol changed the foaming properties of the unstable soaps. In particular, a more robust foam structure was produced in the presence of the fatty alcohols, as demonstrated by the fatty alcohols reducing the relative impact of the polycarboxylate on foaming. A lower foam height was desired because it indicates a reduced relative surface activity of polycarboxylates. In the ease of decanol, foaming was even reduced with PCF in the solution. The decanol gave a lower foam height because the surfactant-fatty alcohol complex had a higher affinity towards the air/water interface than the polycarboxylate.

In addition, surface tension testing was conducted using the plate method. In the plate method, testing was conducted by immersing a platinum plate into solutions in order to determine the air/liquid interfacial tensions of liquids. A Kruss K12 Tensiometer (Kruss GmbH, Hamburg, Germany) was used in order to determine surface tension changes of the tested liquids. This allowed for a better understanding of the changes happening at the air/liquid interface and surfactant arrangement.

As seen in Table 1, the surface tension testing was conducted for solutions of Foaming Agent 1B, i.e., Stepan Polystep B25. The tests were carried out with and without further solution modification with 1 wt. % dodecanol. The solutions contained different concentrations (1000 ppm and 5000 ppm, respectively) of Foaming Agent 1B, i.e., Stepan Polystep B25. In addition, the tests were conducted with and without solution modification with polycarboxylate ether dispersant in the form of Ethacryl M™ (Coatex) in an amount of 0.1 wt. % (1000 ppm). The surface tension values are in millinewtons per meter (mN/m).

TABLE 1

| | Surface Tension mN/m | |
|---|---|---|
| Ingredient | Foaming Agent 1B modified with 1% Dodecanol | Foaming Agent 1B without Fatty Alcohol |
| 1000 ppm of Foaming Agent 1B | 23.11 | 57.00 |
| 1000 ppm of Foaming Agent 1B with PCE (1000 ppm) | 23.39 | 48.34 |
| 5000 ppm of Foaming Agent 1B | 22.58 | 32.22 |
| 5000 ppm of Foaming Agent 1B with PCE (1000 ppm) | 22.54 | 31.47 |

The results of Table 1 show that the presence of fatty alcohol in the form of dodecanol was beneficial in producing a more robust (e.g., strong) foam than without dodecanol. Also, it can be seen that there was not any deleterious effect on surface tension caused by the use of polycarboxylate dispersant when a fatty alcohol was used with the foaming agent, indicating the stability (e.g., strength) of the foam. Surface tensions of dodecanol modified surfactant solutions decreased, when compared with unmodified surfactant. Lower surface tension generally indicates higher surface activity and can allow for reduction in surfactant usage to achieve the same foaming properties.

Furthermore, degradation of the foam generated from the unstable Foaming Agents 1A and 1B was evaluated. The foaming agents were considered alone and when the surfactant solution was modified with fatty alcohol as set forth in FIGS. 4 and 5. Degradation was determined by measuring the foam height in mm with aging time.

Figure 4:
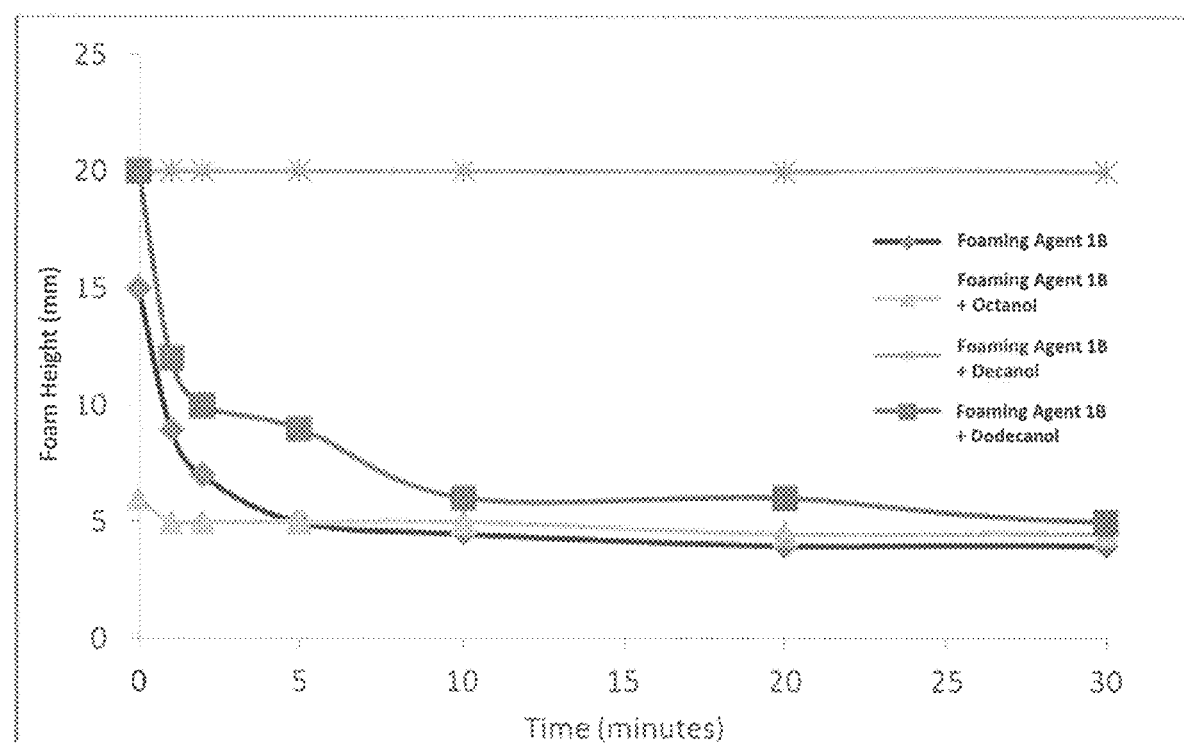
FIG. 4 is a graph of foam height (mm) (Y-axis) versus time (X-axis) of foaming agent solutions containing Foaming Agent 1B, as described in Example 1 herein.
Figure 5:
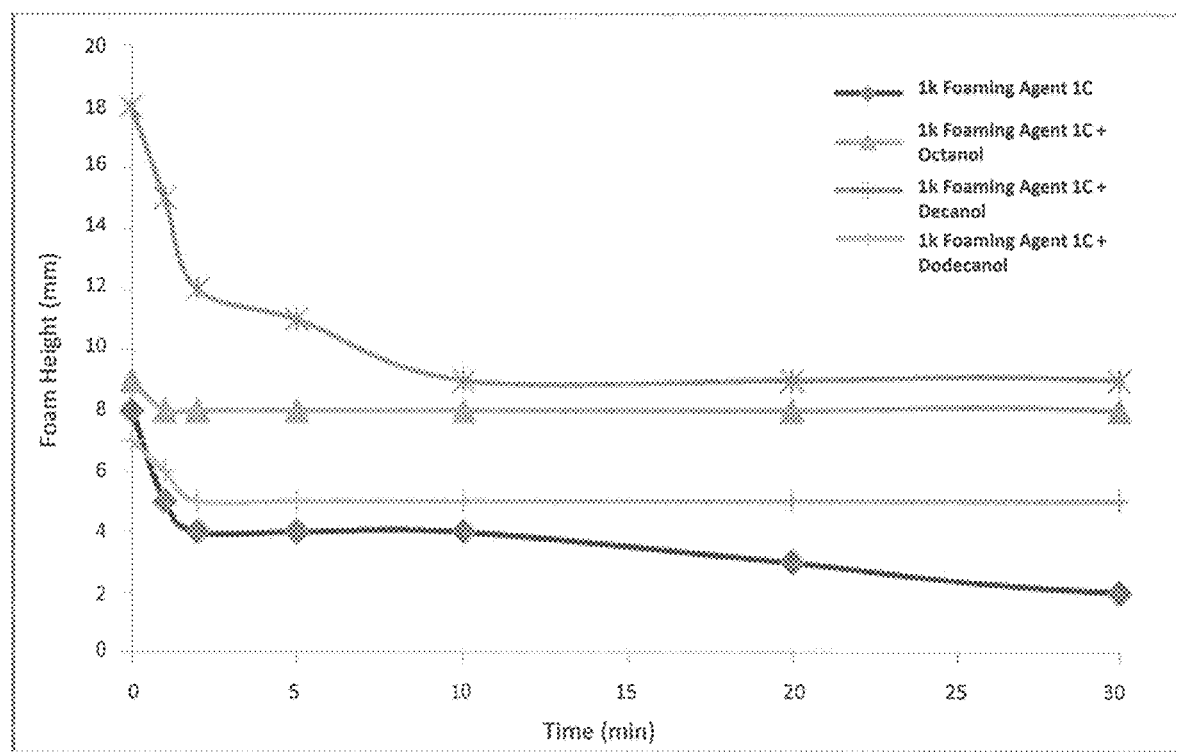
FIG. 5 is a graph of foam height (mm) (Y-axis) versus time (X-axis) of foaming agent solutions containing Foaming Agent 1C, as described in Example 1 herein.

As seen in FIGS. 4 and 5 modification of the surfactant solutions with fatty alcohols also influenced degradation. In FIG. 5, "1k" refers to 1000 ppm of foaming agent in the solution. Foam heights were higher for all modified soaps, and the results show that modified soaps degrade at a slower pace than conventional foaming agents. A rapid decrease of foam height indicates unstable bubbles and significant liquid drainage from the foam. In all cases, the soap solutions modified with fatty alcohol lasted longer and did not degrade as quickly as conventional unmodified soaps.

Example 2

This example demonstrates the effect of fatty alcohols on the foaming properties of foaming agents in wallboard manufacture.

Wallboard was prepared on a commercial manufacturing line. Each board was prepared from the formulation set forth in Table 2. The boards were each made with foaming agent in the form of an alkyl ether sulfate and alkyl sulfate at a ratio of 40:60, by soap blending with water and subsequent foam generation and foam mixing with the gypsum slurry. The alkyl ether sulfate was in the form of Geo Hyonic PFM 33, while the alkyl sulfate was in the than of Geo Hyonic 25 AS (both available from Geo Specialty Chemicals).

The BMA was a ball milled accelerator, which contained gypsum and was prepared by dry milling with dextrose. The dispersant was a polycarboxylate dispersant in the form of BASF Melflux 541, commercially available from BASF, Germany. The retarder was a 1% solution of an aqueous solution of the pentasodium salt of diethylenetriaminepentaacetic acid (Versenex™ 80, commercially available from DOW Chemical Company, Midland, Mich.), and prepared by mixing 1 part (weight) of Versenex™ 80 with 99 parts (weight) of water.

Dry and wet ingredients were introduced separately into a mixer to form a stucco slurry (sometimes called a gypsum slurry). The slurry was discharged onto a moving paper cover sheet traveling on a conveyor so that slurry spread to form a core over the paper. A dense skim coat was applied onto the paper cover sheet with the use of a roller. Dense slurry traveled around the edges of the roller to form the edges of the board. A second cover sheet was applied to the core to form a sandwich structure of a board precursor in the form of a long, continuous ribbon. The ribbon was allowed to set, and was cut, kiln dried, and processed to form the final board product.

TABLE 2

|  | Weight (lbs/MSF) | Weight % (Based on weight of Stucco) |
| --- | --- | --- |
| Stucco | 1880 | — |
| Water | 1223 | 65.05% |
| Dispersant (BASF 541) | 3.2 | 0.17% |
| Total soap | 0.6 | 0.03% |
| BMA | 6 | 0.32% |
| Starch (Acid Modified) | 6.5 | 0.35% |
| Retarder (Versenex) | 0.2 | 0.01% |
| Glass Fiber | 6 | 0.32% |
| Board Weight | 2240 | — |

Four types of board were made from the formulation of Table 2, with the difference relating to the presence of a long chain alcohol with the foaming agent. Board 2A was a control and did not include any modification of the foaming agent with fatty alcohol. Board 2B was prepared with foaming agent that included 1% of 1-dodecanol, added to the foaming agent. Board 2C was prepared with foaming agent that included 1% of 1-decanol. Board 2D was prepared with foaming agent that included 1% of 1-octanol. The foaming agents were prepared with the aid of a foam generating apparatus by high shear mixing of soap solution with pressurized air and introduced to the slurry outside of the main mixer, before the slurry outlet.

Figure 6:
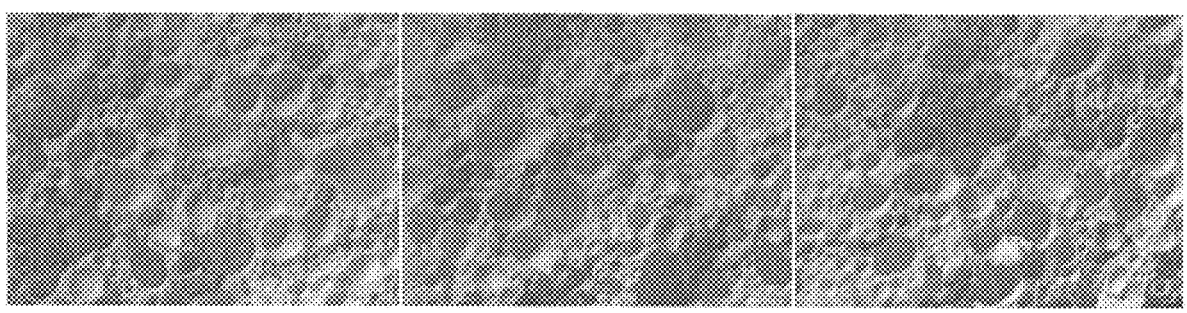
FIGS. 6A-6C are optical micrograph images at 20 times magnification of the cross-section of a control wallboard 2A prepared without any fatty alcohol, as described in Example 2 herein.
Figure 7:
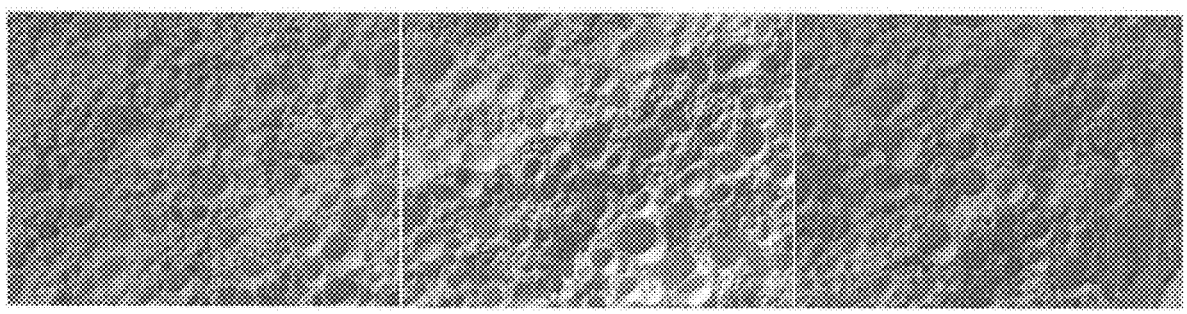
FIGS. 7A-7C are optical micrograph images at 20 times magnification of the cross-section of wallboard 2B prepared with a foaming agent blend with 1% of dodecanol, as described in Example 2 herein
Figure 8:
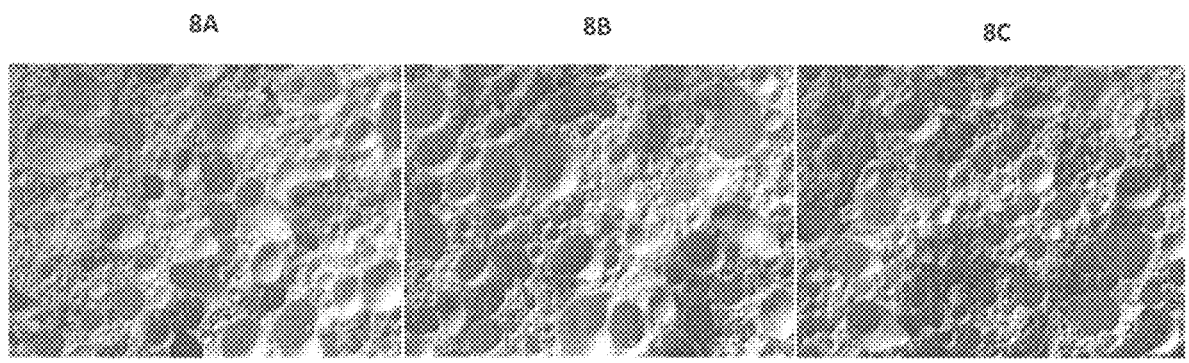
FIGS. 8A-8C are optical micrograph images at 20 times magnification of the cross-section of wallboard 2C prepared with a foaming agent blend with 1% of decanol, as described in Example 2 herein.
Figure 9:
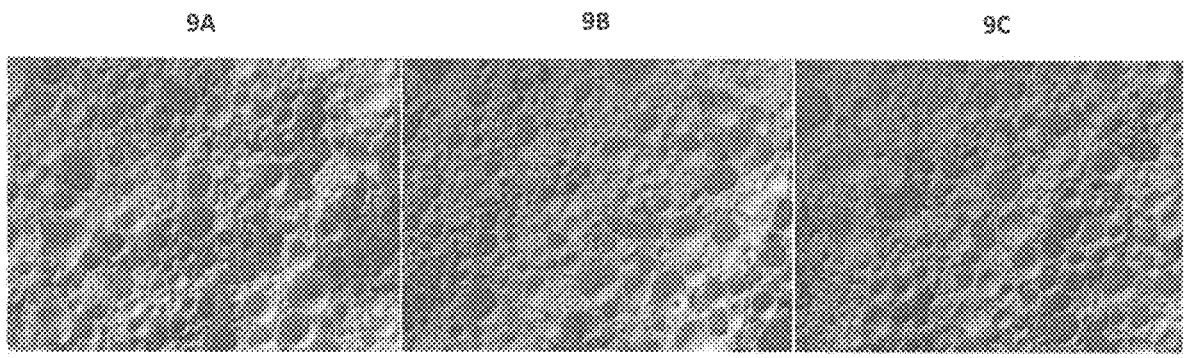
FIGS. 9A-9C are optical micrograph images at 20 times magnification of the cross-section of wallboard 2D prepared with a foaming agent blend with 1% of octanol, as described in Example 2 herein.
Figure 10:
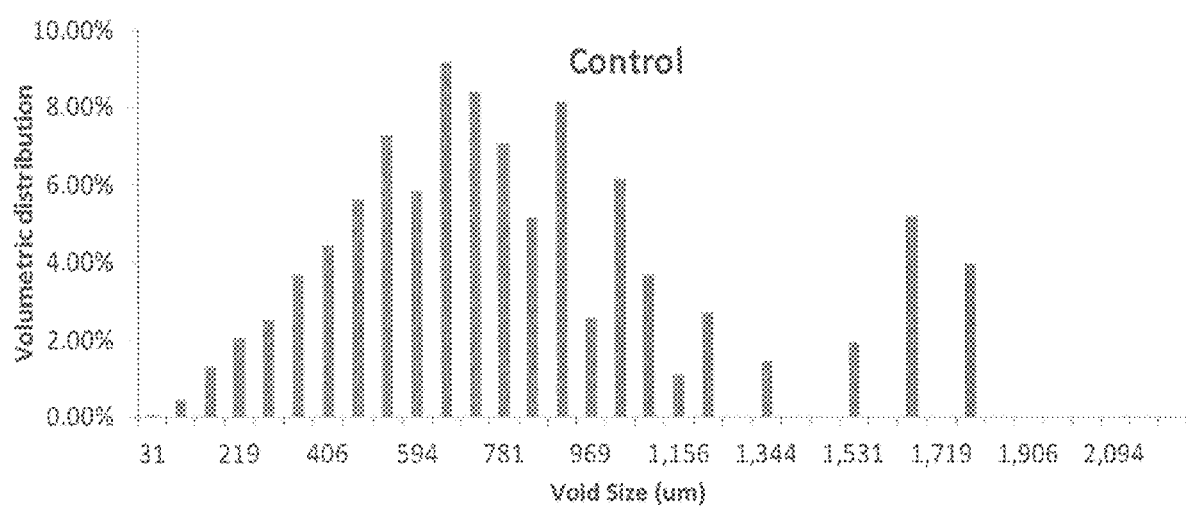
FIG. 10 is a bar graph of volumetric distribution (%) (Y-axis) versus void size in control wallboard 2A, as described in Example 2 herein.
Figure 11:
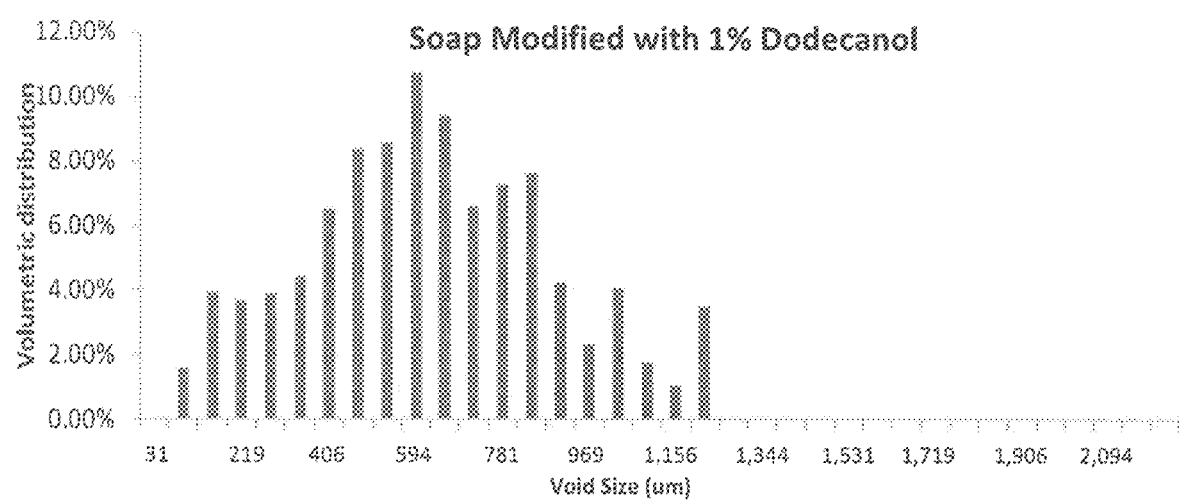
FIG. 11 is a bar graph of volumetric distribution (%) of voids (Y-axis) versus void size (microns) (X-axis) in wallboard 2B prepared with foaming agent modified with 1% dodecanol, as described in Example 2 herein.
Figure 12:
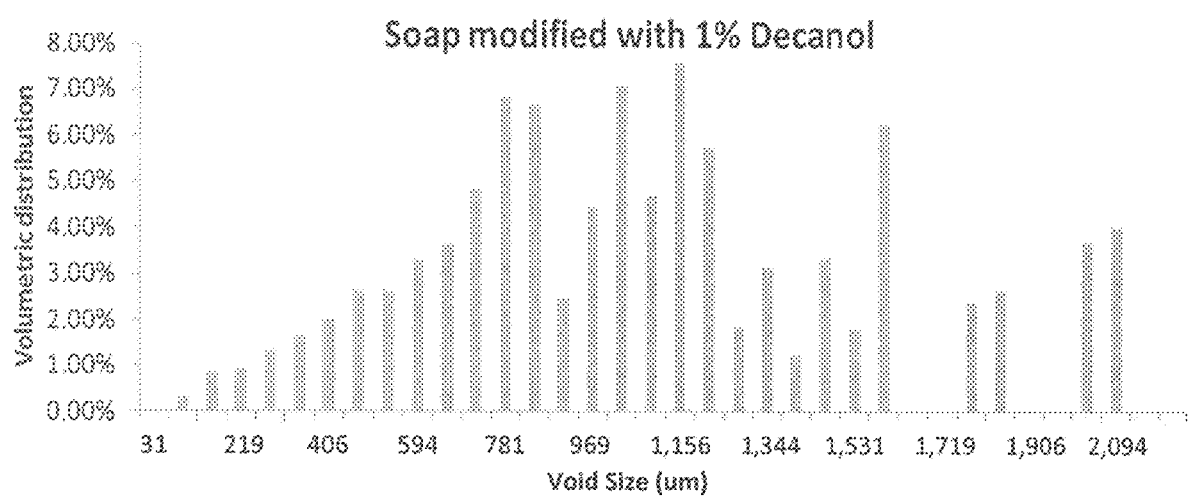
FIG. 12 is a bar graph of volumetric distribution (%) (Y-axis) versus void size (microns) (X-axis) in wallboard 2C prepared with foaming agent modified with 1% decanol, described in Example 2 herein.

Images taken from optical microscope at 20× magnification were taken from the core of each type of board. A total of nine optical microscopy images were taken from each of Boards 2A-2D. The nine images from each board were taken from nine different points in the same board core and three were randomly selected for each board, which are presented as examples of cores in FIGS. 6A to 9C. FIGS. 6A-6C are the images from Control Board 2A. FIGS. 7A-7C are images from Board 2B. FIGS. 8A-8C are images from Board 2G. FIGS. 9A-9C are images from Board 2D. As seen in these FIGS., the core structure was influenced after the introduction of soap modifiers. As shown in FIGS. 6A-6C, the core structure of Control Board 2A has a significant number of larger voids, while Board 2B (FIGS. 7A-7C) and Board 2D (FIGS. 9A-9C) showed a reduction of size of the larger voids and reduced the overall void size, while Board 2C (FIGS. 8A-8C) showed an increase of the void size.

Six images per condition were analyzed. The images randomly selected from each experimental condition for void analysis (i.e., FIGS. 6A-6C, 7A-7C, 8A-8C, 9A-9C,) were analyzed with the aid of Clemex Vision PE, available from Clemex Technologies, Inc., Longueuil, Quebec. For each image, void (bubble) size diameter was manually measured for each void. A distribution was provided by the software. A summary of the results are reported in Table 3.

TABLE 3

|  | Void Size (μm) | |
| --- | --- | --- |
|  | Arithmetic Average | Volumetric Average |
| Board 2A (Control) (Regular soap blend) | 234 | 819 |
| Board 2B (Soap blend modified with 1% of 1-Dodecanol) | 168 | 627 |

TABLE 3-continued

|  | Void Size (μm) | |
| --- | --- | --- |
|  | Arithmetic Average | Volumetric Average |
| Board 2C (Soap blend modified with 1% of 1-Decanol) | 245 | 1092 |
| Board 2D (Soap blend modified with 1% of 1-Octanol) | 188 | 739 |

The arithmetic average was determined by the software and indicates the arithmetic average of void diameter (in micrometers) from all voids within the board. The volumetric average was determined from the distribution diagrams developed by the software and indicates the average void sizes weighted by volume.

Figure 13:
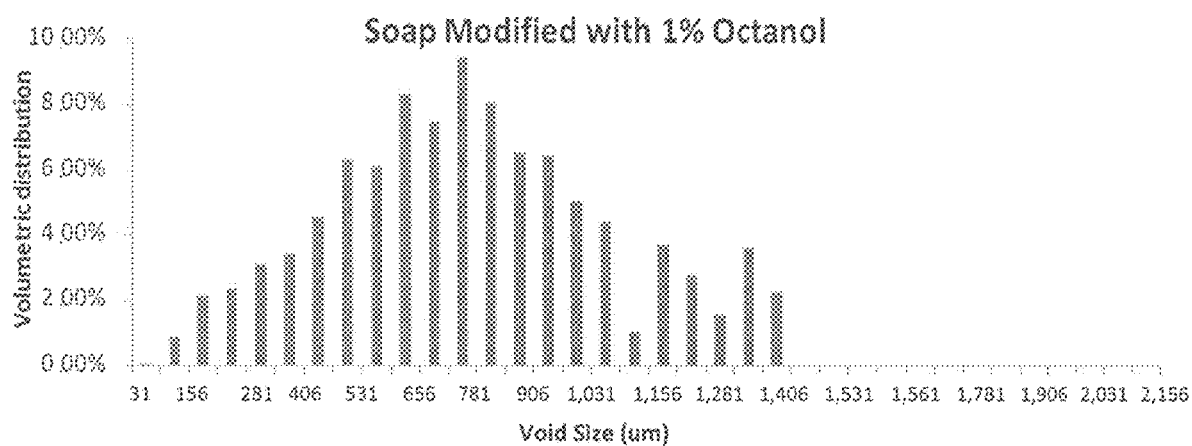
FIG. 13 is a bar graph of volumetric distribution (IN (Y-axis) versus void size (microns) (X-axis) in wallboard 2D prepared with foaming agent modified with 1% octanol, as described in Example 2 herein.

Furthermore, FIGS. 10-13 are bar graphs illustrating volumetric distributions of each of Boards 2A (FIG. 10), 2B (FIG. 11), 2C (FIG. 12), and 2D (FIG. 13). The bar graphs show the volumetric frequency of voids as a function of void size in micrometers.

As seen from Table 3 and FIGS. 10-13, the voids in the Control Board 2A were generally larger and more dispersed, while the voids of Boards 2B, and 2D were smaller and narrower in distribution. The voids of control board were larger and more evenly distributed. The distribution of the voids in the Control Board 2A was bimodal, while the distribution in Boards 2B and 2D was monomodal and Gaussian.

These results demonstrate that surfactant (soap) modification in foaming agent is sufficient to induce void size distribution changes in wallboard, without otherwise changing the formulation or surfactant dosage. These results further show that a more favored distribution (narrower or wider) can be easily achieved without the need of a new surfactant blend.

Example 3

This example illustrates that soap modifications can reduce the surface tension of foaming agent blends. In particular, surface tension testing was conducted using the plate method, as described in Example 1, with a Kruss K12 Tensiometer.

The surface tension testing was conducted for solutions of Foaming Agent 3A, i.e., Stepan B25, and Foaming Agent 3B, i.e., Hyonic 25AS. The tests for each foaming agent were carried out without further solution modification (control), and also with further solution modification with 1 wt. % dodecanol, 1 wt. % decanol, and 1 wt. % octanol. The solutions contained different concentrations (2000 ppm, 1000 ppm and 500 ppm, respectively) of the foaming agents. The results are shown in Table 4.

TABLE 4

|  | Surface tension mN/m | | |
| --- | --- | --- | --- |
|  | 500 ppm | 1000 ppm | 2000 ppm |
| Foaming Agent 3A (Polystep B25) | 64 | 54 | 45 |
| Foaming Agent 3A with 1-Dodecanol | 28 | 25 | 23 |
| Foaming Agent 3A with 1-Decanol | 41 | 36 | 27 |
| Foaming Agent 3A with 1-Octanol | 53 | 46 | 38 |
| Foaming Agent 3B (Hyonic 25AS) | 60 | 51 | 41 |

TABLE 4-continued

| | Surface tension mN/m | | |
|---|---|---|---|
| | 500 ppm | 1000 ppm | 2000 ppm |
| Foaming Agent 3B with 1-Dodecanol | 23.1 | 23.8 | 22.5 |
| Foaming Agent 3B with 1-Decanol | 50.4 | 41.5 | 31.0 |
| Foaming Agent 3B with 1-Octanol | 57.9 | 50.1 | 39.6 |

The results of Table 4 show that the presence of fatty alcohol was beneficial in producing a more surface active soap blend. For example, it can be seen that surface tension of modified soap was reduced, indicating the stability (e.g., strength) of the foam was improved. Surface tension of alcohol-modified surfactant solutions decreased, when compared with unmodified surfactant. Lower surface tension generally indicates higher surface activity and can allow for reduction in surfactant usage to achieve the same foaming properties.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. As used herein, it will be understood that the term "bonding relation" does not necessarily mean that two layers are in immediate contact. The terms "comprising," "having," "including," and "containing" are to be construed as open-ended terms (i.e., meaning "including, but not limited to,") unless otherwise noted. Also, everywhere "comprising" (or its equivalent) is recited, the "comprising" is considered to incorporate "consisting essentially of" and "consisting of." Thus, an embodiment "comprising" (an) element(s) supports embodiments "consisting essentially of" and "consisting of" the recited element(s). Everywhere "consisting essentially of" is recited is considered to incorporate "consisting of." Thus, an embodiment "consisting essentially of" (an) element(s) supports embodiments "consisting of" the recited element(s). Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of making a foamed cementitious board comprising:
   (a) blending a first amount of a first foaming agent, a second amount of a second foaming agent, and a third amount of a fatty alcohol to form an aqueous blended stream, wherein the first, second, and third amounts are in a first weight ratio, and wherein the aqueous blended stream consists of at least one alkyl sulfate, at least one alkyl ether sulfate, a fatty alcohol, and water;
   (b) controllably changing the first, second, and/or third amounts to form a second weight ratio, which is different than the first weight ratio;
   (c) inserting air into the blended stream to form foam;
   (d) mixing at least water, cementitious material, and the foam to form a slurry;
   (e) disposing the slurry between a first cover sheet and a second cover sheet to form a board precursor;
   (f) cutting the board precursor into a board; and
   (g) drying the board.

2. The method of claim 1, wherein a process controller is used to controllably change the first, second, and/or third amounts.

3. The method of claim 2, wherein the first, second, and third amounts are controlled by a flow metering system, and wherein the process controller communicates with the flow metering system to adjust one or more of the first, second, and third amounts.

4. The method of claim 3, wherein the flow metering system comprises at least one pump operatively associated with valves for controlling flow of each of the first foaming agent, second foaming agent, and fatty alcohol into the aqueous blended stream.

5. The method of claim 1, wherein the fatty alcohol is a $C_6$-$C_{20}$ fatty alcohol.

6. The method of claim 1, wherein the fatty alcohol is octanol, nonanol, decanol, undecanol, dodecanol, or any combination thereof.

7. The method of claim 1, wherein the slurry further comprises a dispersant.

8. The method of claim 1, wherein the slurry further comprises a non-migrating starch that increases the strength of the board compared to the same board prepared without the starch.

9. The method of claim 1, wherein the slurry further comprises a polyphosphate.

10. The method of claim 1, wherein the board has a density of about 17 pcf to about 31 pcf.

11. The method of claim 1, wherein the alkyl ether sulfate is combined with the fatty alcohol prior to addition of the alkyl sulfate.

12. The method of claim 1, wherein the alkyl sulfate is combined with the fatty alcohol prior to addition of the alkyl ether sulfate.

* * * * *